United States Patent
Leary et al.

(10) Patent No.: US 11,900,815 B2
(45) Date of Patent: Feb. 13, 2024

(54) AUGMENTED REALITY WAYFINDING IN RIDESHARE APPLICATIONS

(71) Applicant: GM CRUISE HOLDINGS LLC, San Francisco, CA (US)

(72) Inventors: Jessica Leary, San Francisco, CA (US); Jonathon Staff, San Francisco, CA (US); Pratikbhai Patel, San Francisco, CA (US); Bradley Ryan, San Francisco, CA (US); Josh Berlin, San Francisco, CA (US); John Logan Anderson, San Francisco, CA (US); Michael Magnoli, San Francisco, CA (US); Stanley Shiao, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/589,068

(22) Filed: Sep. 30, 2019

(65) Prior Publication Data

US 2021/0097866 A1 Apr. 1, 2021

(51) Int. Cl.
*G08G 1/123* (2006.01)
*G08G 1/00* (2006.01)
(Continued)

(52) U.S. Cl.
CPC .............. *G08G 1/205* (2013.01); *B60W 10/30* (2013.01); *G05D 1/0038* (2013.01);
(Continued)

(58) Field of Classification Search
CPC ....... G08G 1/205; G08G 1/202; B60W 10/30; G05D 1/0038; G05D 1/0248; G06T 19/006
(Continued)

(56) References Cited

U.S. PATENT DOCUMENTS

| | | | |
|---|---|---|---|
| 9,613,386 B1* | 4/2017 | Arden | G01C 21/3438 |
| 10,059,255 B1* | 8/2018 | Schreiber | H05B 47/16 |
| 10,178,890 B1* | 1/2019 | Andon | A43C 19/00 |

(Continued)

FOREIGN PATENT DOCUMENTS

WO 2018129458 A1 7/2018

OTHER PUBLICATIONS

International Search Report and Written Opinion for International Application No. PCT/US2019/068336, dated Jul. 7, 2020, 9 pages.

*Primary Examiner* — Naomi J Small
(74) *Attorney, Agent, or Firm* — Novak Druce Carroll LLP

(57) ABSTRACT

Technologies for providing augmented reality wayfinding experiences in ridesharing applications are provided. In some examples, a method for providing augmented reality wayfinding experiences can include determining a first location of an autonomous vehicle (AV) relative to a second location of a client device associated with a user that requested a ride from the AV; based on the first location of the AV relative to the second location of the client device, determining a direction from the second location of the client device to the first location of the AV; presenting, at the client device, a feed from a camera sensor associated with the client device, the feed including a local scene captured by the camera sensor; and presenting a virtual content overlay on the feed, the virtual content overlay including an indication of the direction from the second location of the client device to the first location of the AV.

20 Claims, 12 Drawing Sheets

(51) Int. Cl.
*B60W 10/30* (2006.01)
*G05D 1/00* (2006.01)
*G05D 1/02* (2020.01)
*G06T 19/00* (2011.01)

(52) U.S. Cl.
CPC .......... *G05D 1/0248* (2013.01); *G08G 1/202* (2013.01); *G06T 19/006* (2013.01)

(58) Field of Classification Search
USPC ........................................................ 340/990
See application file for complete search history.

(56) References Cited

U.S. PATENT DOCUMENTS

| | | | |
|---|---|---|---|
| 10,809,081 B1 | 10/2020 | Kentley-Klay et al. | |
| 11,092,456 B2 * | 8/2021 | Mangal | G06F 18/25 |
| 2016/0214533 A1 * | 7/2016 | Doyle | H04N 7/181 |
| 2017/0192426 A1 * | 7/2017 | Rust | B60W 30/00 |
| 2017/0276494 A1 * | 9/2017 | Kusano | G01C 21/3415 |
| 2017/0294130 A1 * | 10/2017 | Donnelly | H04W 12/50 |
| 2017/0316533 A1 * | 11/2017 | Goldman-Shenhar | H04L 67/306 |
| 2017/0343375 A1 * | 11/2017 | Kamhi | H04W 4/40 |
| 2018/0137373 A1 | 5/2018 | Rasmusson, Jr. et al. | |
| 2018/0188731 A1 * | 7/2018 | Matthiesen | B60R 25/24 |
| 2018/0196417 A1 * | 7/2018 | Iagnemma et al. | G05D 1/0027 |
| 2018/0322775 A1 * | 11/2018 | Chase | G05D 1/0291 |
| 2018/0342035 A1 | 11/2018 | Sweeney et al. | |
| 2018/0349699 A1 * | 12/2018 | O'Connell | G01C 21/3438 |
| 2018/0357907 A1 * | 12/2018 | Reiley | H04W 4/023 |
| 2019/0019329 A1 | 1/2019 | Eyler et al. | |
| 2019/0206258 A1 * | 7/2019 | Chang | G06T 19/006 |
| 2020/0073681 A1 | 3/2020 | Carroll | |
| 2020/0089973 A1 | 3/2020 | Efland | |
| 2020/0151916 A1 * | 5/2020 | Kenney | G06T 11/00 |
| 2020/0191593 A1 * | 6/2020 | Herman | G06Q 10/02 |
| 2020/0232809 A1 | 7/2020 | Rogan et al. | |
| 2020/0309557 A1 | 10/2020 | Efland | |
| 2021/0142678 A1 | 5/2021 | Chang et al. | |

* cited by examiner

AUGMENTED REALITY WAYFINDING IN RIDESHARE APPLICATIONS

TECHNICAL FIELD

The present disclosure generally relates to providing wayfinding assistance to autonomous vehicle riders using augmented reality.

BACKGROUND

An autonomous vehicle is a motorized vehicle that can navigate without a human driver. An example autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

Autonomous vehicles can be implemented by companies to provide self-driving car services for the public, such as taxi or ride-hailing (e.g., ride-sharing) services. The self-driving car services can increase transportation options and provide a flexible and convenient way to transport users between locations. To use a self-driving car service, a user will typically request a ride through an application provided by the self-driving car service. When requesting the ride, the user can define a specific pick-up and drop-off location, which the self-driving car service can use to identify the route of the user and select a nearby autonomous vehicle that is able to provide the requested ride to the user. The self-driving car service can then deploy the autonomous vehicle to pick up and transport the user to the drop-off location. Upon reaching the drop-off location, the user can disembark the vehicle and continue to their final destination.

Unfortunately, the pick-up and drop-off experience of users can be confusing and unclear. For example, when picking up users, autonomous vehicles do not always pull over at the location the user anticipates. This can be due to various reasons including traffic and environment conditions, for example. In addition, current ridesharing applications do not have accurate location information regarding their autonomous vehicles. Thus, users can have a difficult time finding their requested autonomous vehicle at pick-up, and are frequently left searching for their ride when the estimated time of arrival comes and goes. Moreover, at drop off, users can be left disoriented and unable to efficiently determine the path or direction to their final destination. Many times, users will wander around trying to orient themselves and find a path to their destination. As a result, users often lose valuable time and energy at pick-up and drop-off times.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
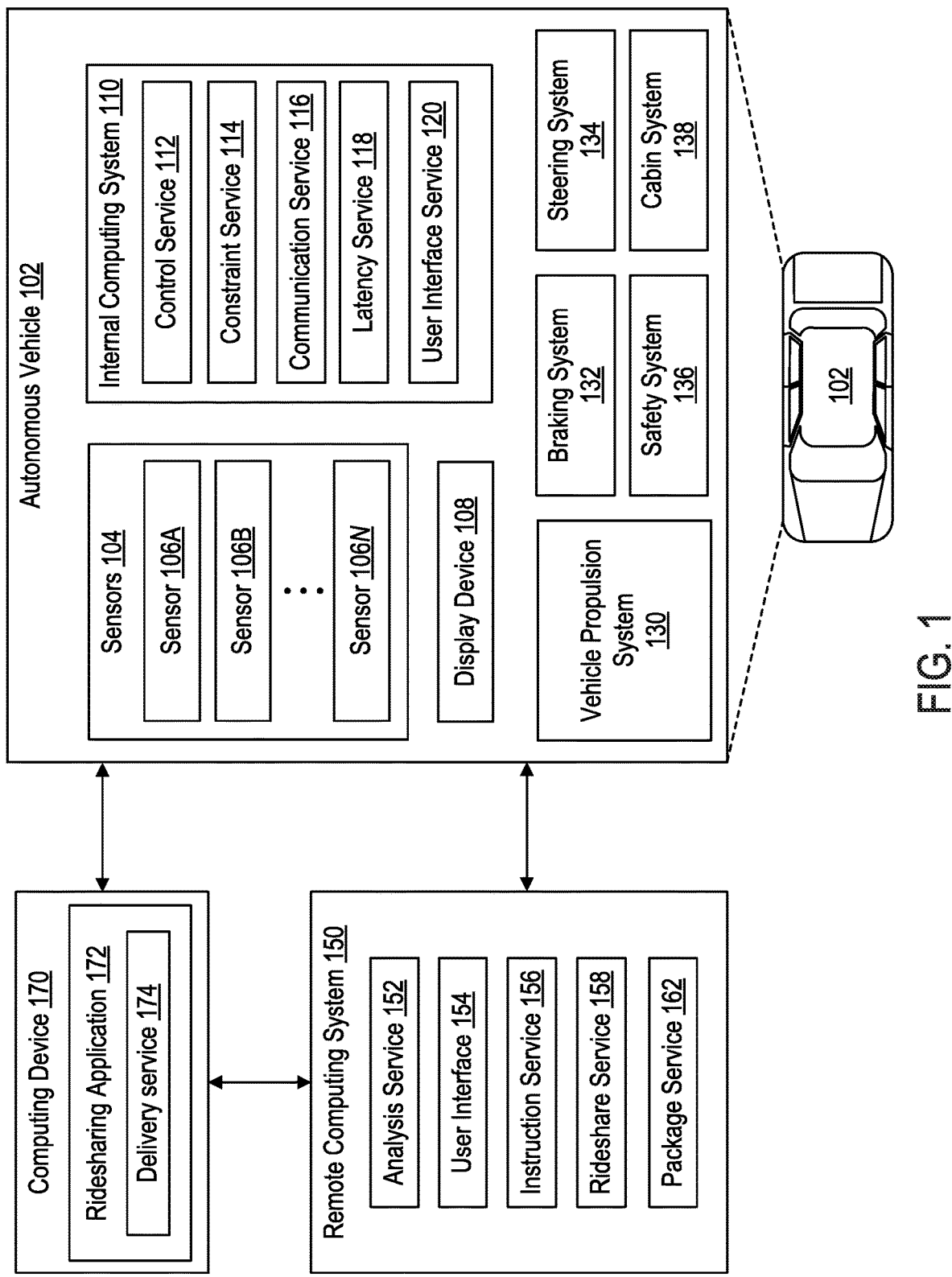
FIG. 1 illustrates an example autonomous vehicle environment including a computing system in communication with an autonomous vehicle, in accordance with some examples.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technologies address a need in the art for intelligent, accurate, and efficient self-driving car service pick up and drop off support and wayfinding assistance. In some aspects, an autonomous vehicle can implement various sensors and devices to understand its surrounding environment and leverage its knowledge of the surrounding environment and its more precise location information to assist riders find their vehicle at pick-up, orient riders upon exiting the vehicle, and guide riders to their final destination. Moreover, in some aspects, the autonomous vehicle can also leverage information available from various sensors on a user's device to help understand the rider's location in order to better assist the rider during pick-up and drop-off.

For example, the autonomous vehicle can leverage one or more sensors on the vehicle and/or the rider's device, such as camera sensors, global positioning system (GPS) sensors, and inertial measurement units (IMUs), to provide more accurate location and position information about the vehicle, determine a rider's relative position and guide the rider in finding the vehicle at pick-up and navigate to their final destination at drop-off. In some examples, the autonomous vehicle can use such information to provide augmented reality (AR) wayfinding and location data to the rider's device to help the rider find their vehicle at pick-up and navigate to their final destination at drop-off. The rider can then use a camera on the rider's device to view a scene or external environment augmented with the wayfinding and location data.

In some examples, after a user requests a ride from an autonomous vehicle (AV), an application on the user's mobile device (e.g., smartphone, smart wearable device, tablet computer, etc.) can be triggered to display a map of the local area populated with location and/or wayfinding information. The map can include an accurate depiction of the AV's current location and route based on location and state information provided by the AV. The user can then activate or engage with an AR wayfinder feature supported by the application, which can include wayfinding information and other cues to help the user find the AV when the AV arrives at the pick-up location. For example, the AV is in the arrived state, the application can notify the user that the user can engage with an AR wayfinder feature that is available for helping the user track and find the AV.

To use the AR wayfinder feature, in some cases, the user can hold the mobile device up (e.g., such that a camera on the device faces an area in front of the user, around the user, or seen by the user) to activate AR mode or otherwise activate the AR mode from the application. The application can display a feed from the mobile device's camera having an AR overlay. The AR overlay can include, for example, a pointer showing the real-time location of the AV, the distance of the AV from the user, etc. In some cases, if the camera is pointed in a direction that does not capture the AV, directional (e.g., left or right) indicators (or any other audio and/or visual indicator or message) may be displayed to show the user which direction to turn to find the AV and/or which direction to point the camera.

In some examples, the AR wayfinder feature can provide a number of indicators and wayfinding data such as, for example and without limitation, a pointer identifying the AV (e.g., a pointer indicating where the parked AV is located), an audio or visual indicator of a state of the AV (e.g., traveling to the pick-up location, waiting for the user, etc.), information associated with the trip and/or pick-up (e.g., an amount of time the AV will wait for the user after parking, a time remaining until the AV leaves, etc.), a distance between the AV and the user, directions and/or a path the user can follow to reach the AV, a visualization of a route to the AV's pick-up or parked location, voice instructions for finding the AV, AV controls the user can implement to help the user identify the AV (e.g., controls for honking the horn, flashing the lights, opening the doors, etc.), etc. In some cases, as the user gets closer to the AV, the range that the visual indicators, such as left and right arrows, appear can change (e.g., widen as the user gets closer, narrow as the user gets farther, etc.) to better reflect the width/configuration of the vehicle in view and/or indicate whether the user is getting closer or farther from the AV.

The AR wayfinder feature can leverage high precision location and/or track data available from the AV, as well as location data of the vehicle in three-dimensional (3D) space (e.g., x coordinates/plane location data, y coordinates/plane location data, z coordinates/plane location data, pitch, yaw, roll, etc.), which in some examples can be obtained from sensors on the mobile device. This information can allow the AR wayfinder feature to place AV indicators accurately on the device's interface (e.g., on a map interface) even if an AV is approaching a user from a location that is difficult or impossible for the user to see (e.g., from the top of a large hill, from behind a large structure, etc.). Moreover, the AR wayfinder feature can also be implemented to assist the user in finding their final destination after (or before) being dropped off. Since the AV is not always able to drop the user off immediately outside of their final destination, the AR wayfinding feature can assist the user by providing live directions.

FIG. 1 illustrates an example autonomous vehicle environment 100. The example autonomous vehicle environment 100 includes an autonomous vehicle 102, a remote computing system 150, and a ridesharing application 172 on a computing device 170. The autonomous vehicle 102, remote computing system 150, computing device 170 (including ridesharing application 172) can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The autonomous vehicle 102 can navigate about roadways without a human driver based on sensor signals generated by sensors 104-108 on the autonomous vehicle 102. The autonomous vehicle 102 can also use one or more of the sensors 104-108 to determine or track a vehicle occupancy, a seat belt engagement status, the position and/or orientation of any riders in the autonomous vehicle 102, the identity of an object on the vehicle, and/or any other rider or occupancy information. The sensors 104-108 on the autonomous vehicle 102 can include one or more types of sensors and can be arranged about the autonomous vehicle 102.

For example, the sensors 104-108 can include, without limitation, one or more inertial measuring units (IMUs), one or more image sensors (e.g., visible light image sensors, infrared image sensors, video camera sensors, etc.), one or more light emitting sensors (e.g., one or more lasers, one or more light detection and ranging sensors (LIDARs), etc.), one or more global positioning system (GPS) devices, one or more radars, one or more sonars, one or more accelerometers, one or more gyroscopes, one or more magnetometers, one or more motion detection sensors, one or more light detectors, one or more audio sensors (e.g., one or more microphones), one or more seat occupancy sensors, one or more seat belt tension or engagement sensors, etc. In some implementations, sensors 104 can include one or more radars, sensors 106 can include one or more image sensors, and sensors 108 can include one or more seat and/or seat belt sensors. Other implementations can include any other number and types of sensors.

The autonomous vehicle 102 can include one or more display devices 108 for presenting information, such as maps, messages, and interfaces, to passengers in the autonomous vehicle 102. The one or more display devices 108 can be mounted on one or more locations in the autonomous vehicle 102. For example, the one or more display devices 108 can be mounted on one or more seats or headrests in the autonomous vehicle 102, a dashboard in the autonomous vehicle 102, one or more inner sides or door panels on the autonomous vehicle 102, a roof of the autonomous vehicle 102, and/or any other interior location of the autonomous vehicle 102. The one or more display devices 108 can include, for example and without limitation, a screen, a television, a projecting device, and/or any other suitable display device for rendering graphical information.

Moreover, the autonomous vehicle 102 can include several mechanical systems that are used to effectuate motion of the autonomous vehicle 102. For instance, the mechanical systems can include, but are not limited to, a vehicle propulsion system 130, a braking system 132, and a steering system 134. The vehicle propulsion system 130 can include an electric motor, an internal combustion engine, or both. The braking system 132 can include an engine brake, brake pads, actuators, and/or any other suitable componentry configured to assist in decelerating the autonomous vehicle 102. The steering system 134 includes suitable componentry configured to control the direction of movement of the autonomous vehicle 102 during navigation.

The autonomous vehicle 102 can include a safety system 136. The safety system 136 can include lights and signal indicators, a parking brake, airbags, etc. The autonomous vehicle 102 can also include a cabin system 138, which can include cabin temperature control systems, in-cabin entertainment systems, display devices, light-emitting devices, audio systems, etc.

The autonomous vehicle 102 can include an internal computing system 110 in communication with the sensors 104-108 and the systems 130, 132, 134, 136, and 138. The internal computing system 110 can include one or more processors and at least one memory for storing instructions executable by the one or more processors. The computer-executable instructions can make up one or more services for controlling the autonomous vehicle 102, communicating with remote computing system 150, receiving inputs from passengers or human co-pilots, logging metrics regarding data collected by sensors 104-108 and human co-pilots, etc.

The internal computing system 110 can include a control service 112 configured to control operation of the vehicle propulsion system 206, the braking system 208, the steering system 210, the safety system 136, and the cabin system 138. The control service 112 can receive sensor signals from the sensors 104-108 can communicate with other services of the internal computing system 110 to effectuate operation of the autonomous vehicle 102. In some examples, control service 112 may carry out operations in concert with one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction on navigation that is activated in accordance with protocols configured to avoid occupying the same space as other objects, abide by traffic laws, circumvent avoidance areas, etc. In some examples, the constraint service 114 can be part of the control service 112.

The internal computing system 110 can also include a communication service 116. The communication service 116 can include software and/or hardware elements for transmitting and receiving signals to and from the remote computing system 150. The communication service 116 can be configured to transmit information wirelessly over a network, for example, through an antenna array or interface system that provides cellular (long-term evolution (LTE), $3^{rd}$ Generation (3G), $5^{th}$ Generation (5G), etc.) communication, Bluetooth communication, near-field communication, and/or any other suitable type of wireless communication.

In some examples, one or more services of the internal computing system 110 are configured to send and receive communications to remote computing system 150 for reporting data for training and evaluating machine learning algorithms, requesting assistance from remote computing system 150 or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150, as information can quickly become too stale to be actionable. When the latency service 118 determines that a response has not been received within a threshold period of time, the latency service 118 can enable other systems of autonomous vehicle 102 or a passenger to make decisions or provide needed feedback.

The internal computing system 110 can also include a user interface service 120 that can communicate with cabin system 138 to provide information or receive information to a human co-pilot or passenger. In some examples, a human co-pilot or passenger can be asked or requested to evaluate and override a constraint from constraint service 114. In other examples, the human co-pilot or passenger may wish to provide an instruction to, or receive an instruction from, the autonomous vehicle 102 regarding destinations, requested routes, drop-off locations, wayfinding tasks, or other requested operations.

As described above, the remote computing system 150 can be configured to send and receive signals to and from the autonomous vehicle 102. The signals can include, for example and without limitation, data reported for training and evaluating services such as machine learning services, data for requesting assistance from remote computing system 150 or a human operator, software service updates, rideshare pickup and drop off instructions, etc.

The remote computing system 150 can include an analysis service 152 configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, images, sounds reported from the autonomous vehicle 102 to an operator of remote computing system 150, maps, routes, navigation data, notifications, user data, vehicle data, software data, and/or any other content. User interface service 154 can receive, from an operator, input instructions for the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on computing device 170. Computing device 170 can include, for example and without limitation, a tablet computer, a laptop computer, a smartphone, a head-mounted display (HMD), a gaming system, a server, a smart device, a laptop computer, a smart wearable (e.g., smart glasses, smart watch, etc.), and/or any other computing device. In some cases, the computing device 170 can be a mobile computing device of a user or passenger/rider. Moreover, in some cases, the remote computing system 150 and the autonomous vehicle 102 can also communicate and interact with other computing devices hosting instances of the ridesharing application 172 and the delivery service 174. For example, the remote computing system 150 and the autonomous vehicle 102 can also communicate and interact with other computing devices associated with one or more passengers.

The rideshare service 158 can receive requests from passenger ridesharing application 172, such as user requests to be picked up or dropped off, and can dispatch autonomous vehicle 102 for a requested trip. The rideshare service 158 can also act as an intermediary between the ridesharing application 172 and the autonomous vehicle 102. For example, rideshare service 158 can receive from a passenger instructions for the autonomous vehicle 102, such as instructions to go around an obstacle, change routes, select a drop-off location and/or pick-up location, honk the horn, open doors in the autonomous vehicle 102, etc. The rideshare service 158 can provide such instructions to the autonomous vehicle 102 as requested.

The remote computing system 150 can also include a package service 162 configured to interact with the computing device 170, the ridesharing application 172 and/or a delivery service 174 of the ridesharing application 172. A user operating the ridesharing application 172 can interact with the delivery service 174 to specify information regarding a package to be delivered using the autonomous vehicle 102. The specified information can include, for example and without limitation, package dimensions, a package weight, a destination address, delivery instructions (e.g., a delivery time, a delivery note, a delivery constraint, etc.), and so forth.

The package service 162 can interact with the delivery service 174 to provide a package identifier to the user for package labeling and tracking. Package delivery service 174 can also inform a user of where to bring their labeled package for drop off. In some examples, a user can request the autonomous vehicle 102 come to a specific location, such as the user's location, to pick up the package. While delivery service 174 has been shown as part of the ridesharing application 172, it will be appreciated by those of ordinary skill in the art that delivery service 174 can be its own separate application.

One example beneficial aspect of utilizing autonomous vehicle 102 for both ridesharing and package delivery is increased utilization of the autonomous vehicle 102. Instruction service 156 can continuously keep the autonomous vehicle 102 engaged in a productive itinerary between rideshare trips by filling what otherwise would have been idle time with productive package delivery trips.

Figure 2:
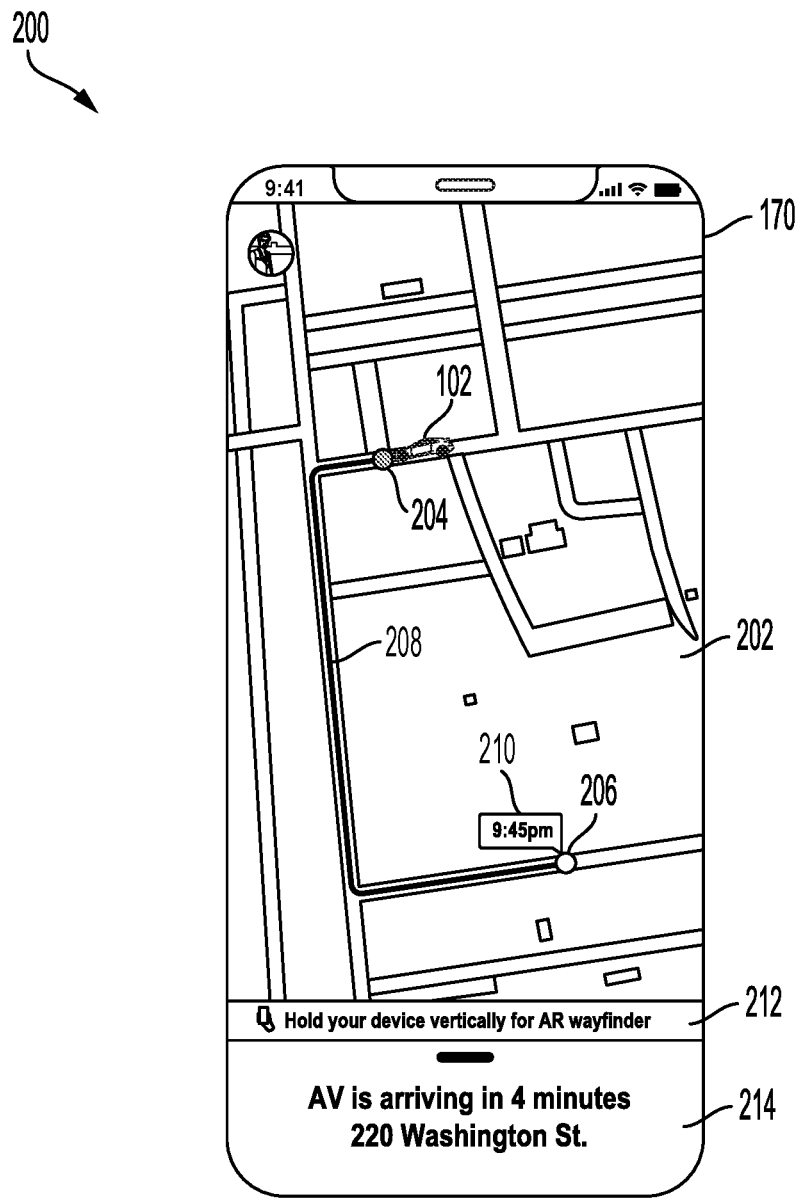
FIG. 2 illustrates an example interface presented on a user's device for tracking an autonomous vehicle after requesting a ride service, in accordance with some examples.

FIG. 2 illustrates an example interface 200 presented on a user's mobile device 170 for tracking the autonomous vehicle 102 after requesting a ride service (e.g., 158). In some examples, the interface 200 can be presented on the mobile device 170 via the ridesharing application 172. Moreover, in some cases, the interface 200 (and/or ridesharing application 172) can be used to activate or trigger an AR wayfinder feature as further described herein. For example, the AR wayfinder feature can be built into the interface 200, the ridesharing application 172, and/or the mobile device 170.

In this example, the interface 200 can include a map 202 of the area. The map 202 can display a current location 204 of the autonomous vehicle 102 and a path 208 from the current location 204 of the autonomous vehicle 102 to the pick-up location 206 set for the trip. In some cases, the map 202 can also display tracking information such as, for example, an estimated time of arrival 210 to the pick-up location 206, traffic information, route information, etc.

In some implementations, the interface 200 can also include instructions 212 informing the user how to activate or trigger an AR wayfinder feature for receiving AR wayfinding information to help the user find and identify the autonomous vehicle 102 when it arrives (or is about to arrive) at or near the pick-up location 206. For example, the instructions 212 can include a notification indicating that the user can hold the mobile device 170 up to activate or trigger the AR wayfinder feature. As another example, the instructions 212 can identify a gesture or control element that the user can utilize to activate or trigger the AR wayfinder feature. When the user activates or triggers the AR wayfinder feature, the interface 200 can access a camera on the mobile device 170 to display a captured view or scene with AR content included as described herein.

The interface 200 can also include an information section 214 for displaying relevant information about the trip, the status of the autonomous vehicle 102, instructions, and/or any other information. For example, the information section 214 can present a status of the autonomous vehicle 102 or an estimated time for arrival to the pick-up location 206. In other examples, the information section 214 can present alerts, instructions, status information, and/or any other information. In some cases, some or all of such information can be provided to the mobile device 170 by the autonomous vehicle 102 (e.g., via the internal computing system 110 and/or the remote computing system 150) for presentation in the interface 200.

Figure 3A:
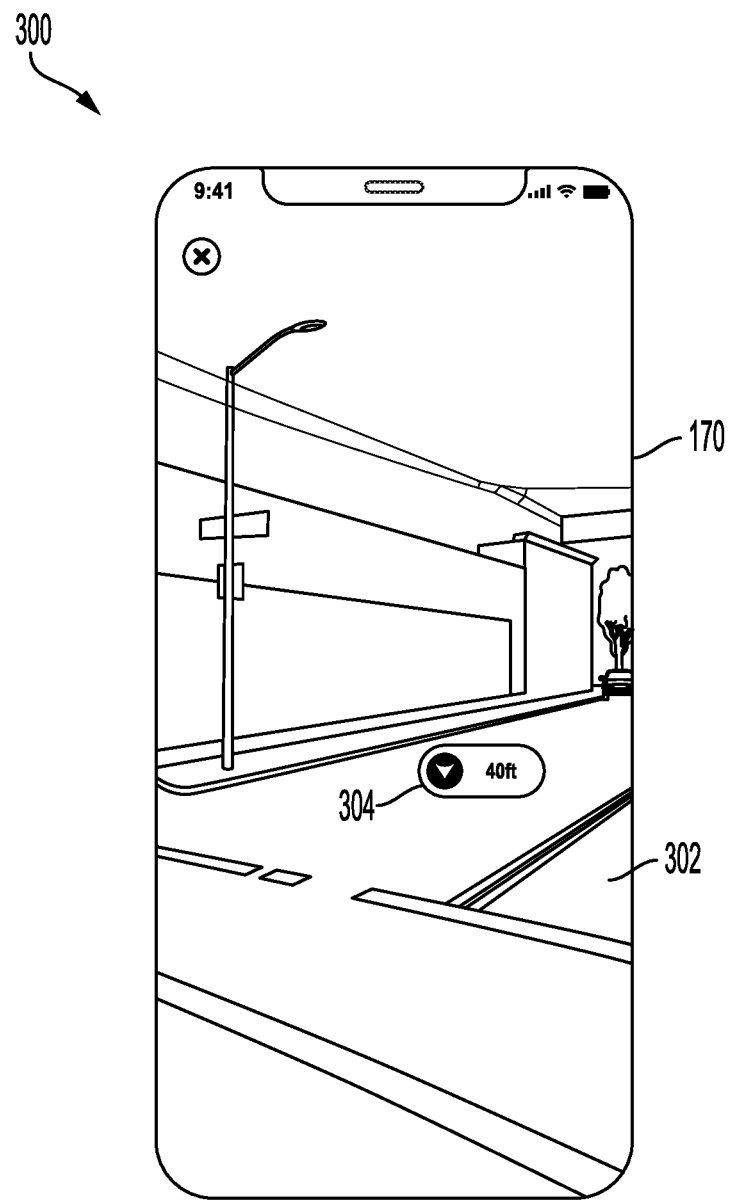
FIGS. 3A and 3B illustrate examples of an augmented reality wayfinder interface for providing wayfinding information to a user, in accordance with some examples.

As previously mentioned, the user can activate or trigger the AR wayfinder feature from the interface 200. FIG. 3A illustrates an example AR wayfinder interface 300 triggered or activated by the user (e.g., from the interface 200). In this example, the AR wayfinder interface 300 can include a camera view 302. The camera view 302 can include a feed from an active camera sensor on the mobile device 170 associated with the user. Based on the feed, the camera view 302 can display a current scene as seen from the view point of the active camera sensor on the mobile device 170 (as well as the view point of the user associated with the mobile device 170). Thus, the camera view 302 can display a scene at the user's current location and can change as the user moves or points the camera sensor on the mobile device 170 to capture a different view or area.

The AR wayfinder interface 300 can also include a virtual content overlay 304. The virtual content overlay 304 can be placed on the camera view 302 to provide an AR experience. Moreover, the virtual content overlay 304 can include information that can help the user find or identify the autonomous vehicle 102. In this example, the virtual content overlay 304 can include an indication of a relative distance between the user and the autonomous vehicle 102. In some cases, the virtual content overlay 304 can be based on the current location of the user and the current location of the autonomous vehicle 102. The mobile device 170 can obtain such information to present in the virtual content overlay 304 from the autonomous vehicle 102 and/or one or more sensors on the mobile device 170.

For example, the mobile device 170 can also determine or track a location of the mobile device 170 (and thus the user carrying the mobile device 170) using one or more sensors and/or systems on the mobile device 170, such as a GPS sensor which can collect location data, a camera sensor which can collect information about the location and scene of the user, an inertial sensor (e.g., an IMU, an accelerometer, a gyroscope, etc.) which can capture inertial information associated with the mobile device 170, an antenna on the mobile device 170 which can collect location information about the mobile device 170 (e.g., via cellular triangulation, an Internet Protocol (IP) address of the mobile device 170, a wireless connection of the mobile device 170 such as a WIFI connection, etc.). In some cases, the mobile device 170 can fuse sensor data or measurements from various sensors or devices to determine a more accurate location of the mobile device 170.

Moreover, the mobile device 170 can obtain the current location of the autonomous vehicle 102 from the autonomous vehicle 102 (e.g., via the internal computing system 110 and/or the remote computing system 150), which can include precise location data based on the various sensors 104 implemented by the autonomous vehicle 102 and any information, such as location data sources, available to the autonomous vehicle 102. For example, the mobile device 170 can receive location data and updates from the autonomous vehicle 102 identifying a current (e.g., live) location of the autonomous vehicle 102.

As the relative distance between the user and the autonomous vehicle 102 (and/or the status/state of the user and/or the autonomous vehicle 102) changes, the AR wayfinder interface 300 can update the virtual content overlay 304 to reflect such changes. Similarly, the AR wayfinder interface 300 can update the camera view 302 to reflect such changes (e.g., based on an updated camera view captured by the camera sensor on the mobile device 170).

Figure 3B:
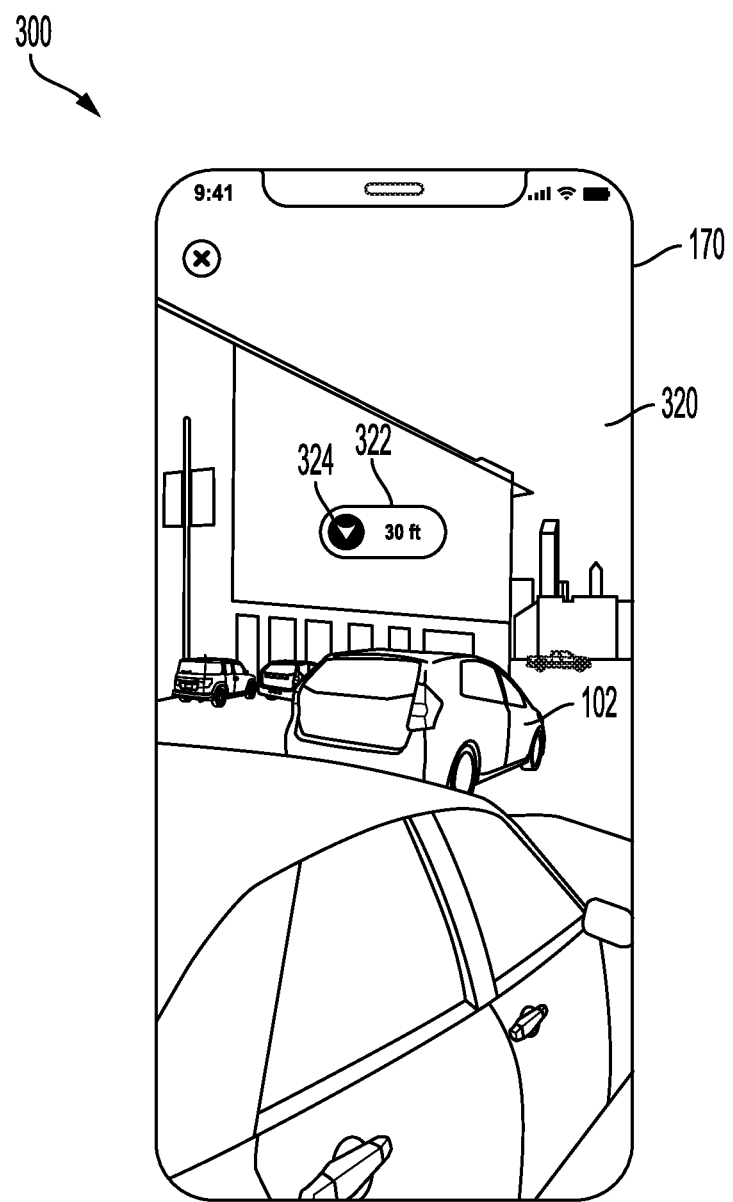

For example, with reference to FIG. 3B, the AR wayfinder interface 300 can present an updated camera view 320 and an updated virtual content overlay 322 to reflect changes in the scene and the relative location or distance of the user and the autonomous vehicle 102. To illustrate, if the user moves towards or away from the autonomous vehicle 102, the AR wayfinder interface 300 can present the updated camera view 320 and the updated virtual content overlay 322 accordingly to reflect the new scene and the new relative location or distance of the user and the autonomous vehicle 102.

In some cases, the updated virtual content overlay 320 can display an indication of the relative distance between the user and the autonomous vehicle 102 to inform the user of how far the user is from the autonomous vehicle 102. In some examples, if the autonomous vehicle 102 is within the field-of-view (FOV) of the camera sensor on the mobile device 170 (and thus visible from the updated camera view 320), the updated virtual content overlay 322 can include a visual pointer 324 identifying the autonomous vehicle 102 and/or the location of the autonomous vehicle 102 within the updated camera view 320. The visual pointer 324 can help the user identify the autonomous vehicle 102, which can be particularly helpful in crowded areas with multiple vehicles in the surrounding area where it may be harder for the user to identify the particular vehicle.

In some examples, the user can interact with the visual pointer 324 to obtain additional information. For example, the visual pointer 324 can be a selectable or interactive interface element that allows the user to click, select, or activate the visual pointer 324 to obtain or request more granular (or different) information for finding or identifying the autonomous vehicle 102.

Figure 4A:
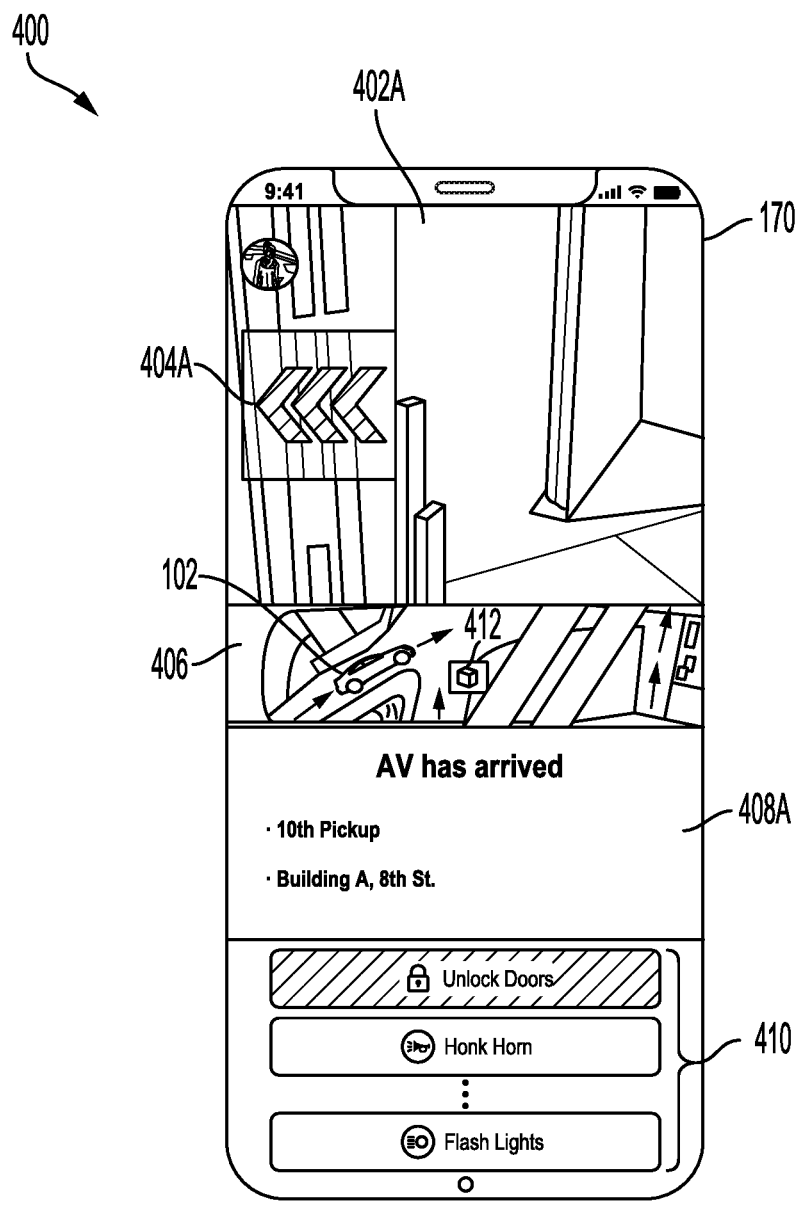
FIGS. 4A through 4D illustrate example augmented reality wayfinder interfaces displayed on a device associated with a user, in accordance with some examples.

FIG. 4A illustrates another example AR wayfinder interface 400 displayed on the mobile device 170. The AR wayfinder interface 400 can be presented on the mobile device 170 via an application, such as ridesharing application 172. Moreover, as previously noted, the AR wayfinder interface 400 can be displayed to help the user find and identify the autonomous vehicle 102 when the autonomous vehicle 102 reaches the pick-up location for the user or is near the pick-up location for the user. The AR wayfinder interface 400 can leverage data obtained from the autonomous vehicle 102 and the mobile device 170 to provide/present wayfinding and other information on the AR wayfinder interface 400.

In some cases, such data from the autonomous vehicle 102 can include, for example and without limitation, a current location/position of the autonomous vehicle 102, a status of the autonomous vehicle 102, a description of the autonomous vehicle 102, wayfinding instructions, trip or pick-up details or cues, suggestions, notifications, etc. The location/position information from the autonomous vehicle 102 can include data obtained from one or more sensors 104 (e.g., one or more camera sensors, inertial sensors, GPS sensors, altimeters, etc.), a feature map of a scene (e.g., a high fidelity feature map for AR), track data (e.g., track state or estimates, real-time location information, etc.), and so forth. Moreover, the data from the mobile device 170 can include position/location information from one or more sensors on the mobile device 170 (e.g., camera sensor, inertial sensor (IMU, accelerometer, gyroscope, etc.), altimeter, GPS sensor, etc.); a feature map of a scene around the user (e.g., a high or low fidelity feature map for AR); and so forth.

The AR wayfinder interface 400 can include a camera view 402A, which can include a feed from an active camera sensor on the mobile device 170 associated with the user. Based on the feed, the camera view 402A can display a current scene as seen from the view point of the active camera sensor on the mobile device 170 (as well as the view point of the user associated with the mobile device 170). Thus, the camera view 402A can display a scene at the user's current location. The AR wayfinder interface 400 can also change/update the scene and information presented by the camera view 402A as status updates are obtained and/or the user moves or points the camera sensor on the mobile device 170 to a different view, area, direction, etc., as described herein.

The camera view 402A can also include a virtual content overlay 404A. The virtual content overlay 404A can be placed on the camera view 402A to provide the user an AR experience. The virtual content overlay 404A can include information that can help the user find or identify the autonomous vehicle 102. For example, the virtual content overlay 404A can include a pointer indicating a direction towards the autonomous vehicle 102. The pointer can thus identify the direction that the user should travel from the user's current location to access (e.g., get to or reach) the autonomous vehicle 102 at its current (or estimated) location.

The pointer included in the virtual content overlay 404A in this example can take into account the relative locations of the user and the autonomous vehicle 102 to ensure it accurately points towards the direction of the autonomous vehicle 102 and/or accurately identifies the direction towards the autonomous vehicle 102 from the user's location. For example, the mobile device 170 can obtain the location of the autonomous vehicle 102 (e.g., from the internal computing system 110 and/or the remote computing system 150) and the location of the mobile device 170 (e.g., from one or more sensors on the mobile device 170). The mobile device 170 can use that information to determine the relative location of the user and autonomous vehicle 102 and determine a configuration of the pointer (e.g., the direction) based on the relative location determined. The mobile device 170 can then present the pointer in the camera view 402A (e.g., via the virtual content overlay 404A).

In some cases, the configuration of the example pointer noted above with respect to the virtual content overlay 404A can include a direction, size, color, pattern, and/or any other characteristics that can convey different types of information about the direction of the autonomous vehicle 102, the proximity to the autonomous vehicle 102, and/or any other wayfinding and related information. For example, in some cases, the configuration of a pointer can include, in addition to a pointer direction (e.g., to the autonomous vehicle 102), a pointer size conveying or depicting an amount of distance or proximity to the autonomous vehicle 102. To illustrate, the pointer can be larger as the distance or proximity to the autonomous vehicle 102 increases and smaller as the distance or proximity decreases, or vice versa.

Moreover, in some examples, the mobile device 170 can track a movement, location, and/or position of the mobile device 170 and can receive (e.g., from the autonomous vehicle 102) any updates in the movement, location, and/or position of the autonomous vehicle 102 to calculate an updated or current relative distance/proximity and location between the mobile device 170 and the autonomous vehicle 102. The mobile device 170 can use such updated information to change or update the pointer as described above, as well as the virtual content overlay (e.g., 404A) in the camera view 402A and/or any of the information in the AR wayfinder interface 400, as further described below with respect to FIGS. 4B through 4D.

In some implementations, the AR wayfinder interface 400 can include a map 406A of the area. The map 406A can depict the location of the autonomous vehicle 102 and a location 412 of the user and/or the pick-up location. The map 406A can thus provide the user an indication of the relative location and proximity between the autonomous vehicle 102 and the user (and/or the pick-up location).

In some implementations, the AR wayfinder interface 400 can also include an information section 408A for providing relevant information to the user. The information section 408A can present, for example and without limitation, an indication of a status of the autonomous vehicle 102 (e.g., a notification indicating that the autonomous vehicle 102 has arrived or will arrive soon or in an estimated amount of time, an indication of the location where the autonomous vehicle 102 is located or parked, etc.), an address of the pick-up location, an address of the current location of the user/device, an address of the current location of the autonomous vehicle 102, user information (e.g., trip history, preferences, etc.), vehicle information (e.g., a make and model, a color, a year, a configuration of the vehicle, a description of where the vehicle is parked or located, etc.), alerts, suggestions, a walking distance between the autonomous vehicle 102 and the user/device, an amount of time estimated to take to reach the autonomous vehicle 102 from the current location of the user/device, etc.

In some examples, the AR wayfinder interface 400 can also include a controls section 410A. The controls section 410A can include interface elements that the user can select or activate to implement certain controls or operations on the autonomous vehicle 102. For example, the controls section 410A can include one or more interface elements that the user can select or activate to remotely unlock the doors on the autonomous vehicle 102 (e.g., in preparation for entering the vehicle), honk the horn on the autonomous vehicle 102 to help the user identify the autonomous vehicle 102 and/or the location or direction of the autonomous vehicle 102, flash one or more lights on the autonomous vehicle 102 to help the user identify the autonomous vehicle 102, etc. When the user selects or activates one or more interface elements in the controls section 410A, the mobile device 170 can send a signal to the autonomous vehicle 102 to activate or implement the associated controls or operations.

In some cases, the AR wayfinder interface 400 and/or the mobile device 170 can also provide audio messages with wayfinding cues and information. For example, the mobile device 170 can output audio instructions for finding, or navigating to, the autonomous vehicle 102. In some cases, the mobile device 170 can output voice messages with directions to the autonomous vehicle 102 and/or information for the user.

If the mobile device 170 detects a change in the status (e.g., location, position, state, etc.) of the user and/or the autonomous vehicle 102 (e.g., based on data from the autonomous vehicle 102 and/or one or more sensors on the mobile device 170) or identifies new or updated information to present in the AR wayfinder interface 400, the mobile device 170 can update the AR wayfinder interface 400 to present new or updated information accordingly. For example, with reference to FIG. 4B, as the user walks towards the autonomous vehicle 102 thus changing the location of the user and the scene around the user, the AR wayfinder interface 400 can present updated camera view 402B based on a current feed of the camera sensor on the mobile device 170. The current feed can include the current scene captured by the camera sensor and can reflect the user's change in location/scene.

The AR wayfinder interface 400 can also place or present updated virtual content overlay 404B on the updated camera view 402B. The updated virtual content overlay 404B can present wayfinding or directional cues reflecting a new or updated location of the user relative to the autonomous vehicle 102. To illustrate, in the previous example of a virtual pointer included in the virtual content overlay, the virtual pointer can be updated to indicate the direction to the autonomous vehicle 102 given the new or updated location of the user relative to the autonomous vehicle 102.

Figure 4B:
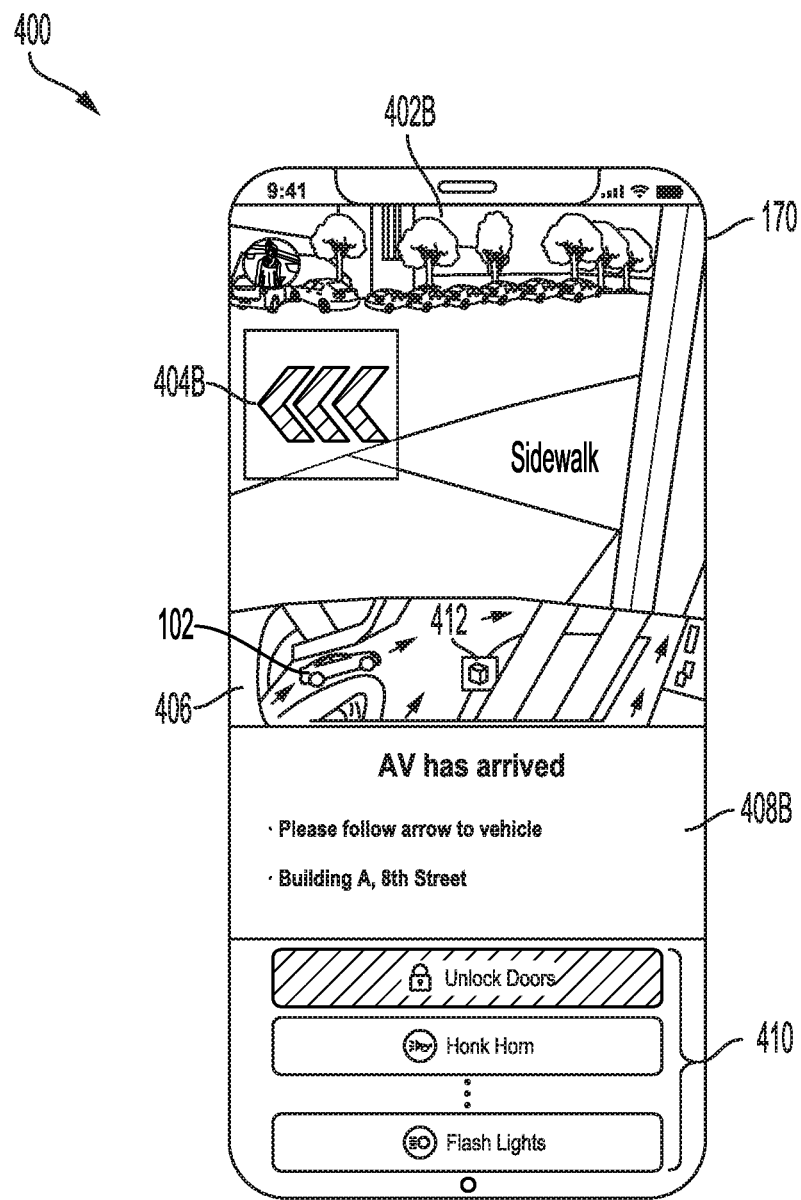

For example, in the example shown in FIG. 4B, the updated virtual content overlay 404B includes a virtual pointer that has been updated based on the user's location to indicate that the user should turn left. The user can thus turn left to continue towards the autonomous vehicle 102, and can continue to follow the virtual pointer, which can continue to update when appropriate, to navigate towards the autonomous vehicle 102 and eventually find and board the vehicle.

In some cases, the AR wayfinder interface 400 can also present changes in the map 406 on the AR wayfinder interface 400. For example, the AR wayfinder interface 400 can update the map 406 to reflect an updated location or state of the user and/or the autonomous vehicle 102. Moreover, the AR wayfinder interface 400 can present an updated information section 408B to provide any new or updated information for the user. For example, the AR wayfinder interface 400 can add or modify an instruction to the user informing the user to follow a pointer in the updated virtual content overlay 404B to find the autonomous vehicle 102.

Figure 4C:
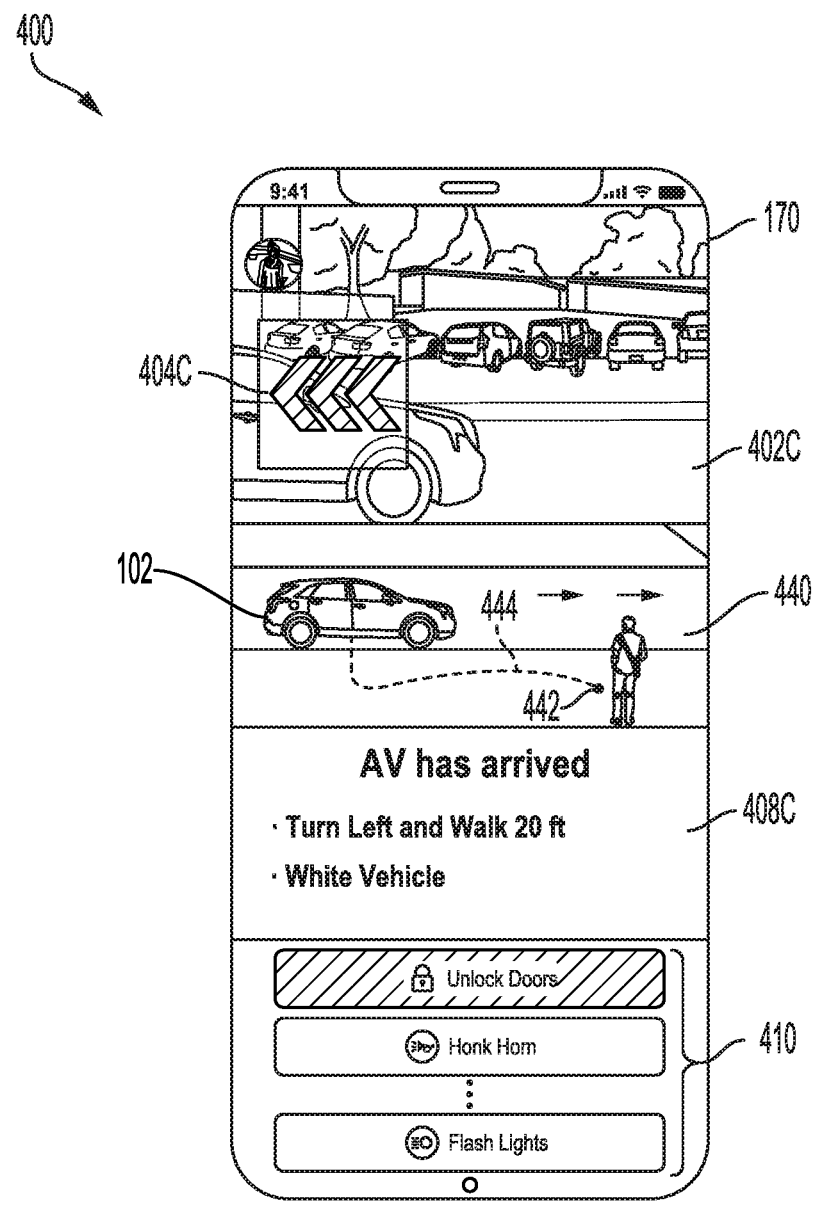

With reference to FIG. 4C, the AR wayfinder interface 400 can continue to change or update content presented in the AR wayfinder interface 400 to reflect changes in state or circumstances (e.g., changes in the user's location, changes in the vehicle's location, changes in the environment, etc.) and/or provide any other information. In FIG. 4C, the user has continued to walk towards the autonomous vehicle 102 and thus the current location of the user has changed. To reflect, or adjust to, the changed location of the user, the AR wayfinder interface 400 can present updated camera view 402C based on a current feed from the camera sensor on the mobile device 170. The updated camera view 402C can depict the current scene captured by the camera sensor (and thus the current scene around the user).

The AR wayfinder interface 400 can also present or place updated virtual content overlay 404C on the updated camera view 402C to provide further or updated wayfinding cues to the user based on the current location of the user, which can further assist the user in finding the autonomous vehicle 102 as previously explained. For example, the AR wayfinder interface 400 can present the updated virtual content overlay 404C with a virtual pointer identifying an updated direction toward the autonomous vehicle 102. The updated direction of the virtual pointer can be based on the current, relative location of the user and the autonomous vehicle 102. The user can look at the virtual pointer to determine or verify which direction to go to find and reach the autonomous vehicle 102.

The AR wayfinder interface 400 can also present an updated map 440 based on the current location of the user and the autonomous vehicle 102. In this example, the updated map 440 depicts a street view showing the autonomous vehicle 102 at its parked location, the user at the current location 442 of the user, and a path 444 from the current location 442 to the autonomous vehicle 102. The updated map 440 can provide additional assistance or wayfinding information to the user, to further help the user find and board the autonomous vehicle 102.

The AR wayfinder interface 400 can also present updated information section 408C including information that is relevant to the user's current location (e.g., 442) and/or that has been added, updated, or modified based on the current location of the user relative to the current location of the autonomous vehicle 102. In the example shown in FIG. 4C, the updated information section 408C includes an instruction indicating that the user should turn left and walk 20 feet to the autonomous vehicle 102. The updated information section 408C in this example also includes a description of the autonomous vehicle 102 to help the user identify the vehicle. If desired, the user can also use one or more controls in the controls section 410 to help find or identify the autonomous vehicle 102, as previously explained.

Figure 4D:
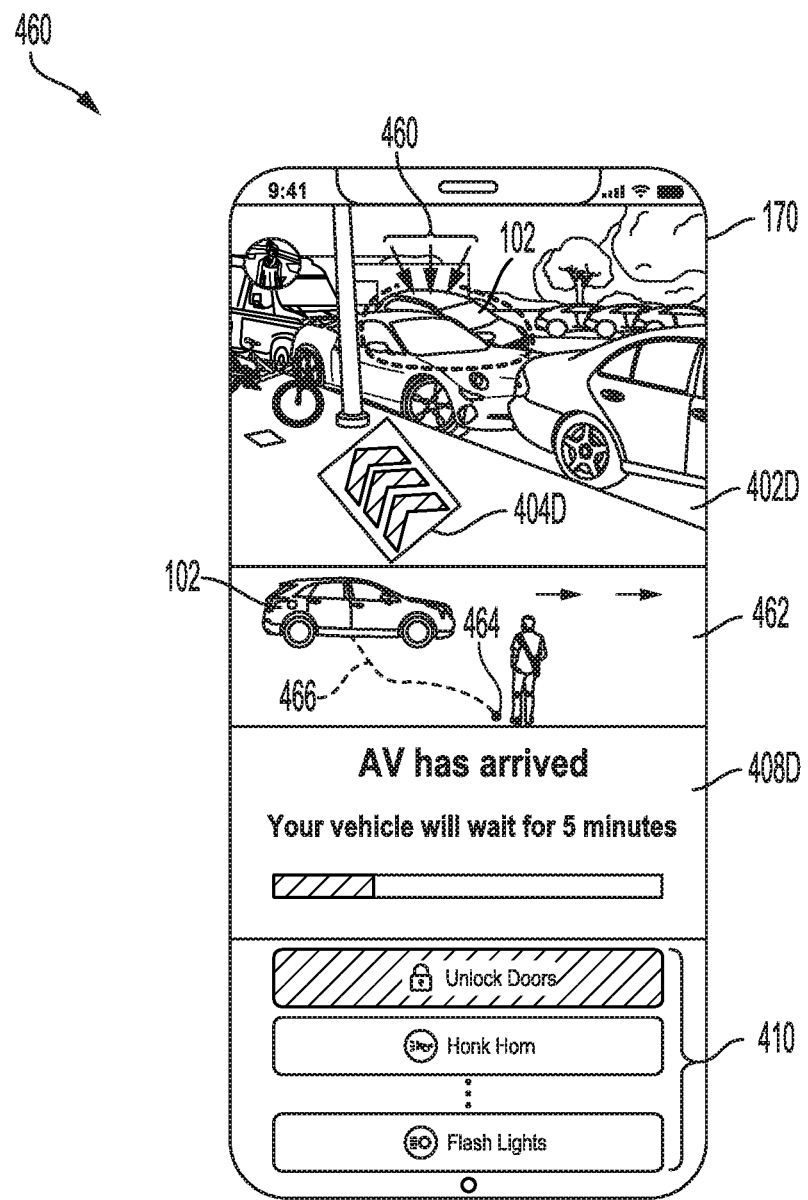

FIG. 4D illustrates an example view of the AR wayfinder interface 400 once the autonomous vehicle 102 is within the FOV of the camera sensor on the mobile device 170 and/or once the user is approaching the autonomous vehicle 102. In this example, an updated camera view 402D displaying a feed from the camera sensor on the mobile device 170 shows the autonomous vehicle 102 at the scene captured by the camera sensor. The updated camera view 402D includes updated virtual content overlay 404D, which in this example shows a virtual pointer identifying a direction to the autonomous vehicle 102.

As shown here, the updated camera view 402D also includes virtual identifiers 460 identifying the autonomous vehicle 102. The virtual identifiers 460 can help the user find and identify the autonomous vehicle 102 from the updated camera view 402D depicting the scene including the autonomous vehicle 102. In some examples, the virtual identifiers 460 can include pointers, labels or tags, and/or any other visual indicator. Moreover, in some cases, to help the user identify the autonomous vehicle 102, the AR wayfinder interface 400 can present the autonomous vehicle 102 in the updated camera view 402D with certain visual effects. For example, the AR wayfinder interface 400 can highlight the autonomous vehicle 102 in the updated camera view 402D, present the autonomous vehicle 102 within a virtual bounding box or shape, render animated effects to draw attention to the autonomous vehicle 102 within the updated camera view 402D, etc.

Moreover, the AR wayfinder interface 400 can present updated map 462 based on the current location of the user and the autonomous vehicle 102. The updated map 462 can provide a street view showing the autonomous vehicle 102 at its parked location, the user at the current location 464 of the user, and a remaining path 466 from the current location 464 to the autonomous vehicle 102. In some cases, the AR wayfinder interface 400 can also present updated information section 408D including relevant wayfinding and/or pick-up information for the user. For example, the updated information section 408D can include a notification that the autonomous vehicle 102 has arrived and an indication of an amount of time the autonomous vehicle 102 will wait for the user.

In some cases, the indication of the amount of time the autonomous vehicle 102 will wait for the user can dynamically update as time passes before the user enters the autonomous vehicle 102. For example, the indication can include a timer and/or progress bar that updates as time passes to reflect the live or current amount of time that the autonomous vehicle 102 will wait for the user. In some implementations, the updated information section 408D can provide other information or messages to the user such as, for example, a notice that the autonomous vehicle 102 is parked on a particular area (e.g., a left or ride side of a particular street, a particular floor on a garage building, a particular entrance on a location, etc.), a notice that the autonomous vehicle 102 on a left or right side relative to the user (which can be based on, for example, a pose calculated for the user based on sensor data obtained by the mobile device 170), etc.

The AR wayfinder interface 400 can present a controls section 410 as previously described. In some examples, as the user approaches the autonomous vehicle 102, the user can remotely open or unlock a door(s) on the autonomous vehicle 102 through an interface element in the controls section 410, so the user can enter the vehicle when the user reaches the vehicle.

Figure 5:
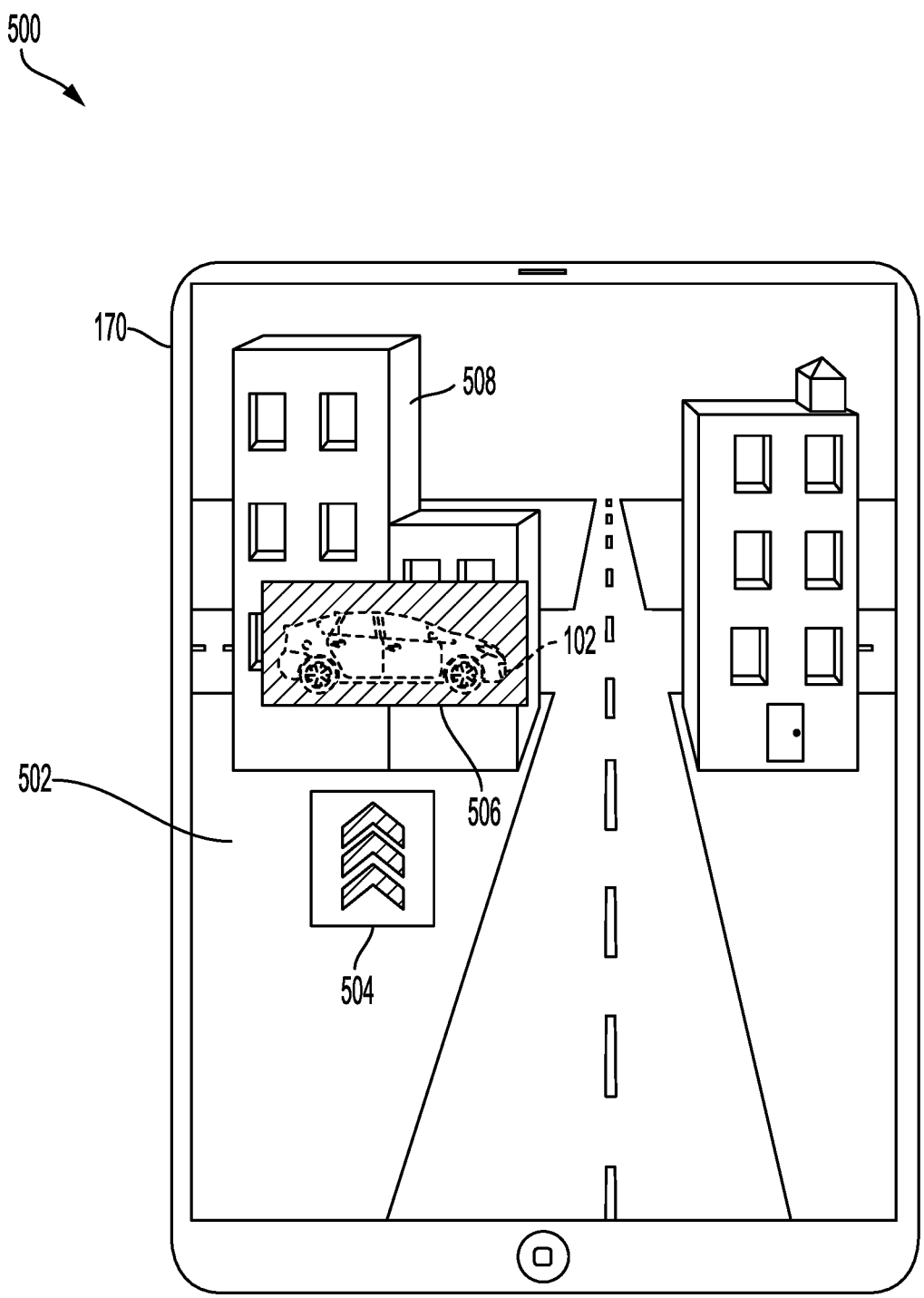
FIG. 5 illustrates an example augmented reality wayfinder interface for helping a user find an autonomous vehicle that is occluded from the user's view, in accordance with some examples.

FIG. 5 illustrates an example AR wayfinder interface 500 for helping a user find an autonomous vehicle 102 that is occluded from the user's view. In some examples, the autonomous vehicle 102 can be occluded by an object, such as a building, or a configuration of the landscape, such as a hill were the user and autonomous vehicle 102 are on opposite ends or locations and the relative altitude differences place the autonomous vehicle 102 outside of the FOV of the user. Moreover, in some examples, the autonomous vehicle 102 can be occluded while parked and waiting for the user or while traveling towards (or approaching) the pick-up location.

The AR wayfinder interface 500 can display a camera view 502 based on a feed from a camera sensor on the mobile device 170, which can depict a scene captured by the camera sensor. In the example camera view 502 displayed by the AR wayfinder interface 500, the autonomous vehicle 102 is parked behind a building 508 and occluded from the user's FOV by the building 508. To help the user find the autonomous vehicle 102 despite being occluded by the building 508, the camera view 502 can be augmented with virtual content identifying the autonomous vehicle 102. For example, the camera view 502 can display a virtual representation 506 of the autonomous vehicle 102 indicating that the autonomous vehicle 102 is located behind the building 508.

In some implementations, the virtual representation 506 can appear as though the autonomous vehicle 102 behind the building 508 can be seen through the building 508. For example, the virtual representation 506 can include an overlay placed over a portion of the building 508 and indicating that the autonomous vehicle 102 is behind the building 508 at the displayed location. In some cases, the AR wayfinder interface 500 can also present additional virtual content in the camera view 502 to provide additional wayfinding information or cues to the user. For example, the AR wayfinder interface 500 can place a virtual content overlay 504 on the camera view 502 including wayfinding cues such as directional pointers as previously described.

In other examples, the AR wayfinder interface 500 and/or the mobile device 170 can also provide audio cues or messages to the user. For example, the mobile device 170 can output voice instructions or suggestions for navigating to the autonomous vehicle 102 and/or locating the autonomous vehicle 102. In some cases, the voice instructions can inform the user that the autonomous vehicle 102 is occluded by a particular object and describe to the user how to navigate to the autonomous vehicle 102 from the user's location and/or how to locate the autonomous vehicle 102.

In some implementations, the autonomous vehicle 102 can also provide the mobile device 170 data for presenting or outputting wayfinding information to help the user find the user's final destination after being dropped off. In many cases, the autonomous vehicle 102 will be unable to drop the user off immediately outside of the user's final destination and/or at the most convenient location for reaching or accessing the final destination. Accordingly, the autonomous vehicle 102 can provide the mobile device 170 information for helping the user navigate to their final destination. The mobile device 102 can use such information to present an interface with wayfinding information and instructions for the user.

In providing such information, the mobile device 102 can also leverage sensor data obtained from one or more sensors (e.g., a camera sensor that can capture scene information and objects, inertial sensors that can help track the user's location and trajectory, a GPS sensor that can provide location information or coordinates, etc.) on the mobile device 102. The sensor data from the one or more sensors on the mobile device 170 can supplement or replace the information provided by the autonomous vehicle 102.

Figure 6:
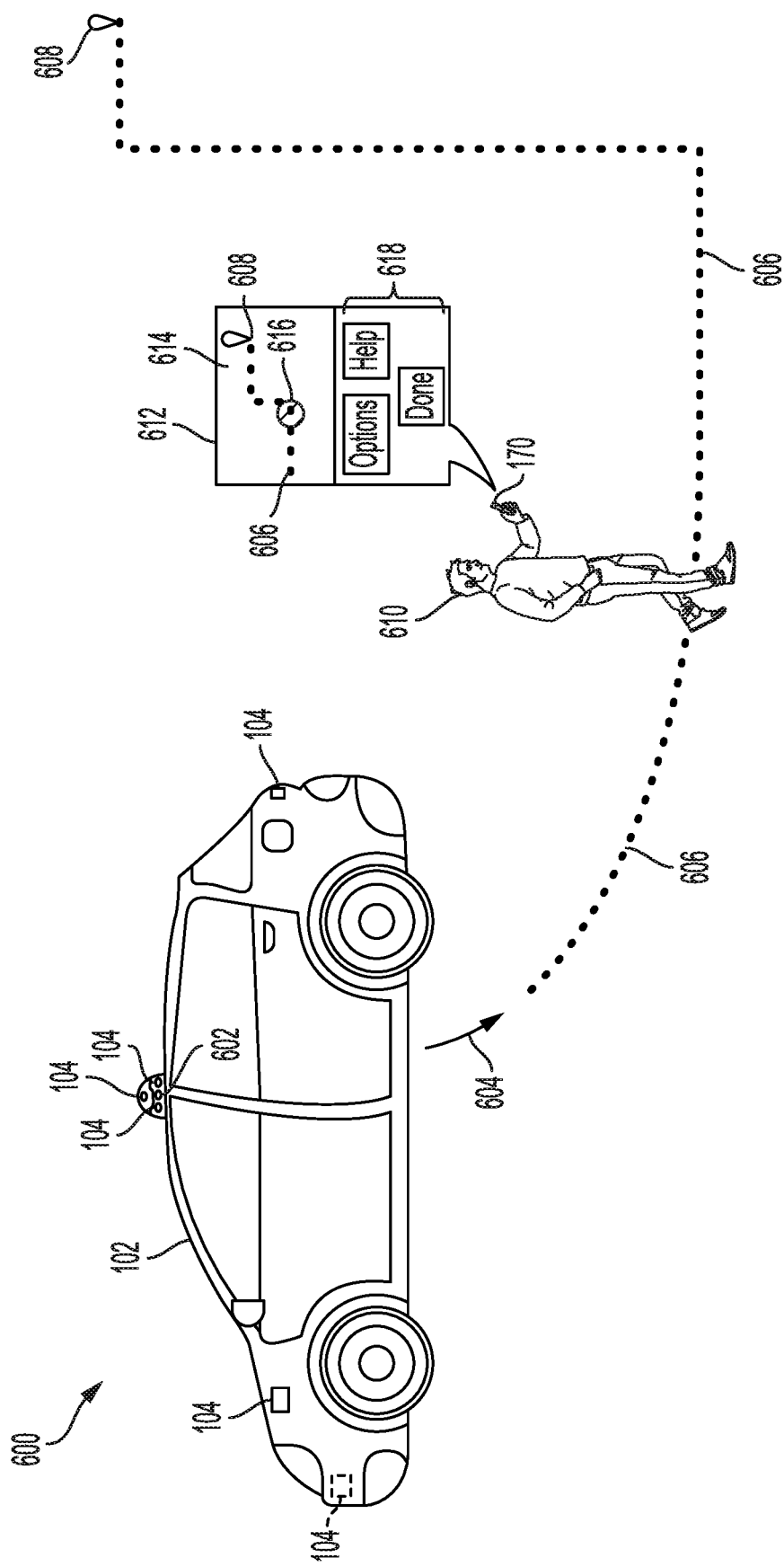
FIG. 6 illustrates an example autonomous vehicle providing a user wayfinding information for navigating to a final destination of the user after drop-off, in accordance with some examples.

FIG. 6 illustrates an example of an autonomous vehicle 102 providing a user 610 wayfinding information for navigating to a final destination 608 of the user 610 after drop-off. The wayfinding information can include, for example and without limitation, instructions for exiting the autonomous vehicle 102, directions (e.g., walking directions) to the final destination 608 of the user 610, information for helping the user 610 locate the final destination 608, information for helping the user access an ingress location at or near the final destination 608, instructions for avoiding one or more obstacles, etc.

In some examples, when the user 610 is in the autonomous vehicle 102 prior to being dropped off, the autonomous vehicle 102 can provide the user 610 an indication how to exit the autonomous vehicle 102 (e.g., which side and door to use to exit the autonomous vehicle 102) at drop off. In some cases, the indication can include, for example, a message or visual signal displayed on a display device 108 in the autonomous vehicle 102 or presented on the mobile device 170 of the user 610. In other cases, the indication can be a light emitted by a light-emitting device in the autonomous vehicle 102, which can signal to the user 610 which door to use to exit the vehicle. For example, the autonomous vehicle 102 can flash a light on a light-emitting device mounted on the rear left door of the vehicle to signal to the user 610 that the user 610 should use the rear left door to exit the vehicle.

In other cases, the indication can be an audio message or signal informing the user 610 to use a particular door to exit the vehicle. The audio message or signal can be provided by a speaker in the autonomous vehicle 102 and/or a speaker on the mobile device 170 of the user 610. Moreover, in some examples, the indication can include a combination of visual and/or audio indications or instructions provided via different devices. For example, the indication can include a message or visual signal displayed on a display device 108 in the autonomous vehicle 102 and/or the mobile device 170, a light emitted by a light-emitting device on the vehicle, and/or an audio message or signal provided by a speaker in the vehicle and/or on the mobile device 170.

Moreover, in some cases, upon the user 610 exiting the autonomous vehicle 102, the autonomous vehicle 102 can provide an indication 604 of a direction the user 610 should travel towards the final destination 608. In some cases, the indication can be a light emitted by an external light-emitting device 602 mounted on an exterior (e.g., on the roof, on an exterior of a door, etc.) of the autonomous vehicle 102. In some examples, the light can be emitted on the same side of the autonomous vehicle 102 as the direction that the user 610 is instructed to travel, which the user 610 can interpret as a signal that the user 610 should travel in that direction. In other examples, the light can be emitted according to a pattern (e.g., a flashing pattern) that the user 610 can interpret as indicating a specific direction to travel.

To illustrate, the external light-emitting device 602 can be configured to output different patterns or light colors to provide different signals or indications to passengers. Each pattern or light color can signify, and can be interpreted as, an instruction to travel in a different direction. For example, a steady light or flash can signify a left direction while a flashing light can signify a right direction, or vice versa. As another example, a red flash can signify a forward direction (e.g., the same direction as the current direction of the autonomous vehicle 102 and/or the user 610) while a different color flash can signify a backward direction (e.g., a direction opposite to the direction of the autonomous vehicle 102 and/or the user 610). Other patterns, colors, or techniques for conveying directional instructions using the external light-emitting device 602 can also be used in other implementations.

The autonomous vehicle 102 can also provide wayfinding information on an interface 612 displayed at the mobile device 170 of the user 610. The interface 612 can include a map 614 depicting a current location 616 of the user 610 and a path 606 to the final destination 608. In some cases, the interface 612 can provide a map visualization from a street perspective, which can depict buildings and/or objects around the user 610 and/or the surrounding environment. In some implementations, the street perspective visualization can be a three-dimensional (3D) visualization of buildings (e.g., including building faces) and/or the surrounding environment.

The interface 612 can also include a display section 618 with one or more interface elements that allow the user 610 to receive or select different options (e.g., alternate paths, alternate modes of travel, etc.), receive or provide information (e.g., notifications, requests, alerts, updates, etc.), and/or interact with the interface 612 (e.g., submit a request for additional help from the autonomous vehicle 102, terminate the trip, change or specify map settings, change or specify interface settings, change or specify wayfinding preferences, etc.).

In some cases, the autonomous vehicle 102 can also provide wayfinding information to the user 610 prior to the user 610 exiting the vehicle. For example, before the user 610 exits the vehicle, the autonomous vehicle 102 can provide a preview (e.g., via a display device 108) of the path 606 from the drop-off location to the final destination 608. As another example, before the user 610 exits the vehicle, the autonomous vehicle 102 can provide the user 610 visual and/or audio instructions or directions (e.g., via a display device 108, a speaker, etc.) for reaching the final destination 608 after exiting the vehicle.

In some implementations, once the user 610 has exited the autonomous vehicle 102, a handoff can occur between the autonomous vehicle 102 and the mobile device 170 of the user 610 (and/or the interface 612) to continue providing wayfinding information to the user 610 through the interface 612 presented on the mobile device 170 of the user 610. In some examples, the handoff can occur when the user 610 exits the autonomous vehicle 102. In other examples, the handoff can be triggered by one or more factors such as, for example and without limitation, a location of the user 610, a proximity of the user 610 to the autonomous vehicle 102 and/or the final destination 608, a specific scenario or circumstance (e.g., noisy area, busy area, traveling distance from the drop-off point to the final destination 608, etc.), and/or any other criteria.

The user 610 can use the wayfinding information provided on the interface 612 to continue towards the final destination 608 and/or reach the final destination 608. In some cases, if the user 610 changes course or starts to go in the wrong direction, the autonomous vehicle 102 can inform the user 610 (e.g., via the interface 612 and/or the mobile device 170) that the user 610 has deviated from the path 606 to the final destination 608 and/or provide the user 610 course correction information (or an option to receive course correction information) and/or an alternate path from the current location of the user 610.

In some cases, the autonomous vehicle 102 and/or mobile device 170 can detect if the user 610 has changed course or started to go in the wrong direction using GPS information obtained from one or more sensors on the mobile device 170 of the user 610. In other cases, the autonomous vehicle 102 and/or the mobile device 170 can detect if the user 610 has changed course or started to go in the wrong direction using a sensor 104 on the outside of the autonomous vehicle 102, such as a camera sensor mounted on an exterior of the autonomous vehicle 102. For example, the autonomous vehicle 102 can track the user 610 using a camera (104) on the vehicle while the user 610 is within a FOV of the camera. If the user 610 starts to travel in the wrong direction, the autonomous vehicle 102 can detect so based on a feed from the camera.

In some implementations, the autonomous vehicle 102 can use both a sensor 104, such as a camera sensor, and GPS information from the mobile device 170 to detect if the user 610 has changed course or started to travel in the wrong direction. Moreover, if the user 610 does not wish to be tracked as previously described, the user 610 can opt out of being tracked and can provide any other privacy preferences. The user 610 can provide such preferences through interface 612, the ridesharing application 172, an input device on the autonomous vehicle 102 (e.g., display device 108), etc.

In some cases, the autonomous vehicle 102 can use one or more sensors 104 on the outside of the vehicle to provide more granular wayfinding details and cues. For example, the autonomous vehicle 102 can use one or more camera sensors, radars, LIDARs, etc., to understand the environment and/or the passenger's position and direction and provide environment cues (e.g., notify the user 610 about obstacles alerts, hazards, accessible or inaccessible areas along the path 606, entrance locations, points of reference, etc.) and/or granular wayfinding details (e.g., shortcuts, wayfinding tips or suggestions, avoidances, description of where a building is located, description of where a door to enter an area or building is, an indication of which door or entrance to use to enter an area or building, etc.).

To illustrate, if an area along the path 606 is blocked by construction or an event, the autonomous vehicle 102 can detect so using one or more sensors 104. The autonomous vehicle 102 can then notify the user 610 that the area along the path 606 is blocked and provide instructions for avoiding the area and reaching the final destination 608 from a deviated path.

Once the user 610 has reached the final destination 608 and/or decided to complete the trip, the user 610 can end the trip through the interface 612, which will signal to the autonomous vehicle 102 to finalize the trip and stop providing wayfinding information to the user 610.

Figure 7:
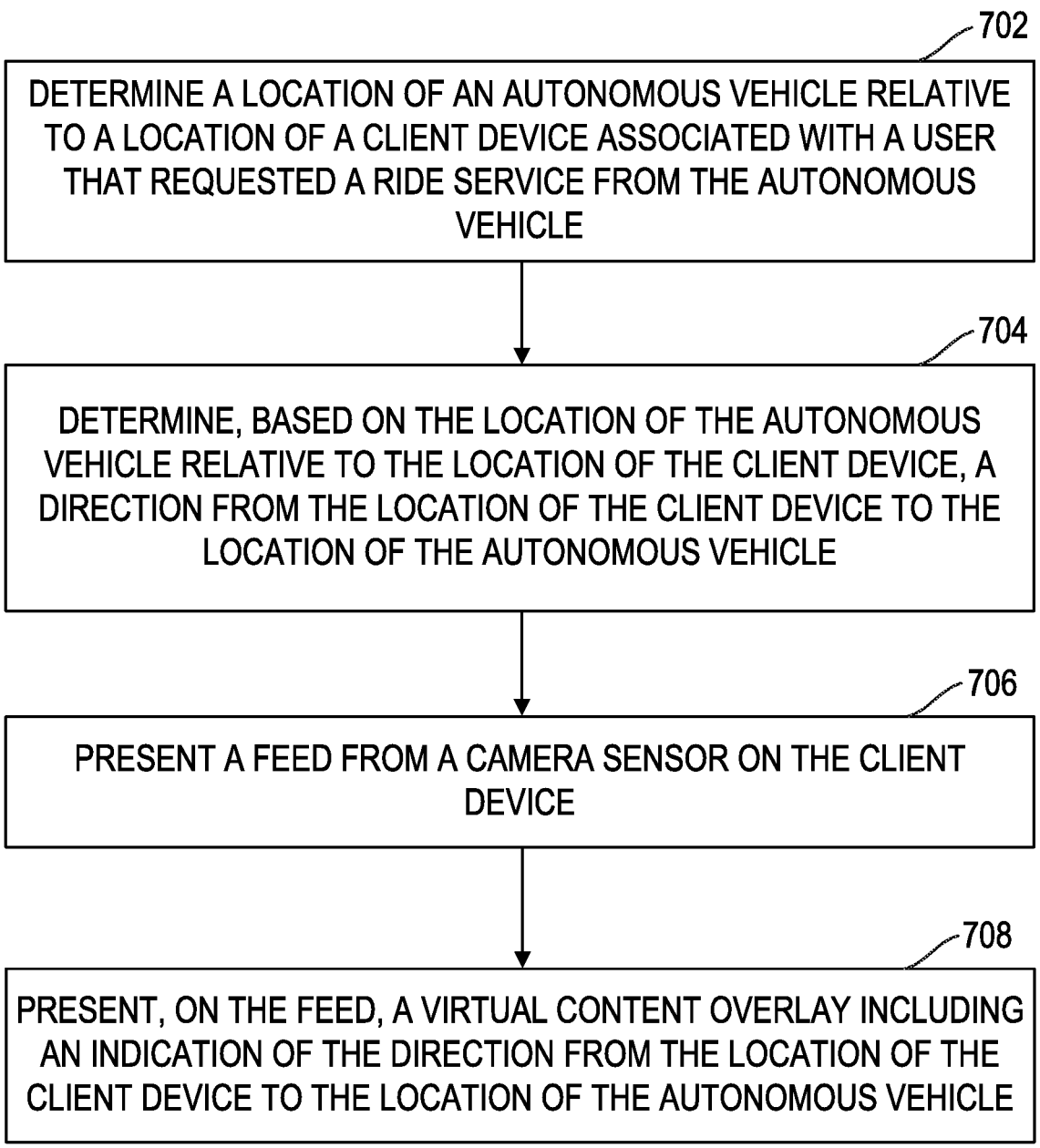
FIG. 7 illustrates an example method for providing an augmented reality experience to assist a user navigate to and locate an autonomous vehicle at a pick-up location, in accordance with some examples.

Having disclosed some example system components and concepts, the disclosure now turns to FIG. 7, which illustrates an example method 700 for providing an AR experience to assist a user navigate to and locate an autonomous vehicle 102 at a pick-up location. The steps outlined herein are exemplary and can be implemented in any combination thereof, including combinations that exclude, add, or modify certain steps.

At step 702, the method 700 can include determining a location of an autonomous vehicle (102) relative to a location of a client device (170) associated with a user that requested a ride service from the autonomous vehicle. The user can be a person that requested, or associated is with a request for, a ride service from the autonomous vehicle and/or a ride service company associated with the autonomous vehicle. Moreover, the client device can be a mobile device used by the user such as, for example and without limitation, a mobile phone, a tablet computer, a head-mounted display device, a smart wearable device (e.g., a smart watch, smart glasses, etc.), a laptop computer, etc. Also, the client device associated with the user can be used to infer the location of the user. For example, since the client device can be a mobile device carried by the user, the location of the client device can be the same as the location of the user.

The ride service can be a ride or trip from a requested pick-up location to a specified drop-off location. In some examples, a user can request a ride service from the autonomous vehicle using a ridesharing application (172). When requesting the ride service, the user can specify a pick-up location for the trip, a pick-up time, and a drop-off location or target drop-off location. In some cases, the user can also specify other information such as, for example, a final destination of the user, one or more user preferences, user information, a number of riders for the requested ride service, and/or any other trip or user information.

In some cases, the location of the autonomous vehicle can be a current location of the autonomous vehicle and/or a pick-up point where the autonomous vehicle is located or parked, and the location of the client device can be a current location of the client device (and thus the user) and/or the pick-up location specified for the ride service. To determine the relative location of the autonomous vehicle and the client device, the client device and/or the autonomous vehicle (e.g., via the internal computing system 110 and/or the remote computing system 150) can calculate the location of the autonomous vehicle and the location of the client device using sensor data from one or more sensors (104). The one or more sensors used to obtain the sensor data can include, for example, one or more GPS sensors, radars, LIDARS, camera sensors, inertial sensors (e.g., inertial measurement units, gyroscopes, accelerometers, etc.), and/or any other sensor that can provide information used to determine, verify, or adjust location parameters.

Moreover, the sensor data can include, for example and without limitation, GPS data, inertial measurements (e.g., motion measurements, pose measurements, etc.), image data (e.g., captured images or video depicting a scene or surrounding environment of the autonomous vehicle and/or the client device), radar measurements, LIDAR measurements, position measurements (e.g., x, y, z coordinates and/or pitch, roll, yaw measurements), etc. In some cases, other data can also be used to determine the location of the autonomous vehicle and/or the client device, such as cellular triangulation data, data indicating a location of a network (e.g., a WIFI network location or Internet Protocol address) to which the client device is connected, data provided by the user, data provided by another user in the autonomous vehicle and/or tracking the autonomous vehicle, etc.

In some cases, the autonomous vehicle (e.g., via the internal computing system 110 and/or the remote computing system 150) can calculate and/or track its location using one or more sensors (104) on the autonomous vehicle, and report its location to the client device. The client device can calculate its own location and use the reported location of the autonomous vehicle to determine the relative locations of the autonomous vehicle and the client device. In other cases, the client device can calculate its location and report it to the autonomous vehicle. The autonomous vehicle can also calculate its own location and use the reported location of the client device to determine the relative locations of the autonomous vehicle and the client device. The autonomous vehicle can then report to the client device the location of the autonomous vehicle relative to the location of the client device.

In some implementations, after the user requests the ride service, a ridesharing application (e.g., 172) on the client device of the user can display a map (e.g., 202) of the local area. The displayed map can include an indication or depiction of the autonomous vehicle's location, a route from the autonomous vehicle's location to the pick-up location and/or the user's location (e.g., the location of the client device of the user), a distance between the autonomous vehicle's location and the pick-up location and/or the user's location, an estimated time of arrival by the autonomous vehicle to a particular pick-up point, traffic and/or environment conditions, notifications, and/or any other trip or map information.

At step 704, the method 700 can include determining, based on the location of the autonomous vehicle relative to the location of the client device, a direction from the location of the client device to the location of the autonomous vehicle. In some cases, the direction can be determined based on the location of the autonomous vehicle when the autonomous vehicle is at (or near) an arrived state (e.g., has reached a pick-up location, has parked at a pick-up location, etc.).

Moreover, the direction from the location of the client device to the location of the autonomous vehicle can include, for example and without limitation, a path or route from the location of the client device to the location of the autonomous vehicle, a trajectory from the location of the client device to the location of the autonomous vehicle, a spatial relation between the locations of the client device and the autonomous vehicle, an orientation from the location of the client device towards the location of the autonomous vehicle, an east-west and/or north-south direction, and/or any other information that can assist a user determine how to reach the location of the autonomous vehicle from the location of the client device and/or which way to travel towards the location of the autonomous vehicle.

At step 706, the method 700 can include presenting (e.g., at the client device) a feed (e.g., camera view 302, 320, 402A, 402B, 402C, 402D, or 502) from a camera sensor on the client device. The feed can include a local scene captured by the camera sensor on the client device. The feed can depict the local scene around the user and can be used to provide AR wayfinding information to help the user find and navigate to the autonomous vehicle by viewing the feed with the AR wayfinding information, as further described herein.

At step 708, the method 700 can include presenting, on the feed, a virtual content overlay (e.g., 304, 322, 404A, 404B, 404C, 404D, 460, 504, or 506) including an indication of the direction from the location of the client device to the location of the autonomous vehicle. In some examples, the feed and virtual content overlay can be presented through an AR wayfinder feature (e.g., AR wayfinder interface 300, 400, or 500) on the client device, as previously described. Moreover, in some cases, the AR wayfinder feature can be accessed through an application on the client device, such as ridesharing application 172.

In some implementations, the client device and/or an application (e.g., ridesharing application 172) on the client device can provide a visual and/or audio hint or cue (e.g., 212) informing the user that the user can hold the client device in a particular way (e.g., vertically, facing forward, etc.) to access or trigger the AR wayfinder feature (e.g., the AR wayfinder interface) at the client device (e.g., through ridesharing application 172), as previously described. Moreover, in some cases, when the autonomous vehicle is in an arrived state (e.g., reached and/or parked at a pick-up location), the client device (e.g., via the ridesharing application 172) can notify the user (e.g., via a visual and/or audio message, an icon, a callout, etc.) that the user can initiate and/or engage with the AR wayfinder feature to find and/or navigate to the autonomous vehicle.

In some implementations, the virtual content overlay can include a virtual pointer or arrow indicating a direction towards the location of the autonomous vehicle, a digital message providing wayfinding information for locating and/or navigating to the autonomous vehicle, a virtual object (e.g., an image, an icon, a callout, a bounding box, a visual representation of an item such as the autonomous vehicle or a path to the autonomous vehicle, a visual cue, an animation, etc.), and/or any other virtual content item. In some cases, the virtual content overlay can be anchored to, and/or superimposed over, a particular region or area within the feed.

For example, if the autonomous vehicle and/or the location of the autonomous vehicle is captured within the feed, the virtual content overlay can be anchored to an area within the feed that is proximate, adjacent, near, or indicative of a location of the autonomous vehicle. To illustrate, a virtual arrow can be anchored to an area adjacent to a rendered location of the autonomous vehicle within the feed and pointing to the autonomous vehicle within the feed, to indicate or highlight where the autonomous vehicle is located. The user can thus view the virtual arrow and autonomous vehicle within the feed to locate the autonomous vehicle in the real world and understand how to reach the autonomous vehicle.

As another example, to indicate that the user should walk in a particular direction along a sidewalk in order to locate and/or reach the autonomous vehicle, a virtual arrow pointing in the particular direction can be anchored to a portion of the sidewalk within the feed. The user can thus view the virtual arrow within the feed and determine based on the virtual arrow that the user should walk along the sidewalk in the particular direction shown by the virtual arrow in order to find and/or reach the autonomous vehicle.

In some cases, the shape, size, and/or configuration of the virtual content overlay can vary based on one or more factors such as, for example and without limitation, a relative distance between the client device and the autonomous vehicle, a type of instruction or indication conveyed by the virtual content overlay, an environment and/or object(s) near the client device and/or the autonomous vehicle, etc. To illustrate, in some cases, the virtual content overlay can include a graphical arrow or pointer showing a direction towards the autonomous vehicle. The color or size of the arrow or pointer can be adjusted or configured based on a relative distance between the client device and the autonomous vehicle.

For example, a size of the arrow or pointer can be increased to reflect a longer distance between the client device and the autonomous vehicle and decreased to reflect a shorter distance between the client device and the autonomous vehicle. Thus, as the user (and the client device) move closer to the autonomous vehicle, a size of the arrow or pointer can be reduced to reflect the shorter distance between the user (and client device) and the autonomous vehicle. On the other hand, if the user goes in the wrong direction and consequently moves farther away from the autonomous vehicle, the arrow or pointer can be updated to have a larger size to reflect a longer distance between the user (and the client device) and the autonomous vehicle.

In some examples, the indication of the direction from the location of the client device to the location of the autonomous vehicle can include a path from the location of the client device to the location of the autonomous vehicle, a direction or instruction for walking from the location of the client device to the location of the autonomous vehicle, a description of the location of the autonomous vehicle, a distance between the location of the client device and the location of the autonomous vehicle, wayfinding instructions, and/or any other navigation or localization information or cues.

In some implementations, the method 700 can include presenting (e.g., at the client device) one or more interface controls for remotely triggering one or more actions at the autonomous vehicle. The user can activate or interact with the interface controls to trigger the one or more actions at the autonomous vehicle. In some examples, the one or more interface controls can be selectable interface elements that a user can select to activate the one or more actions at the autonomous vehicle. Moreover, in some examples, the one or more actions can include activating a horn on the autonomous vehicle (e.g., honking the horn on the autonomous vehicle), flashing a light (e.g., a headlight, an exterior light, etc.) on the autonomous vehicle, unlocking one or more doors on the autonomous vehicle, moving to a different location where the user can ingress the autonomous vehicle from, and/or other actions that can be performed by the autonomous vehicle to help the user find, access, or board the autonomous vehicle.

In some cases, the client device and/or the autonomous vehicle (e.g., via the internal computing system 110 and/or the remote computing system 150) can track a location and/or position of the client device and/or the autonomous vehicle to provide updated tracking and wayfinding information for the user. For example, in some cases, the method 700 can include detecting (e.g., by the client device and/or the autonomous vehicle) that the client device has moved to a different location; tracking a current location of the client device; presenting (e.g., at the client device) an updated feed from the camera sensor, which can include (the updated feed) an updated local scene captured by the camera sensor at the current location; and presenting an updated virtual content overlay on the updated feed.

As another example, in some cases, the method 700 can include detecting (e.g., by the client device and/or the autonomous vehicle) that the autonomous vehicle has moved to a different location; tracking a current location of the autonomous vehicle; presenting (e.g., at the client device) an updated feed from the camera sensor, which can include (the updated feed) an updated local scene captured by the camera sensor at the current location of the camera sensor; and presenting an updated virtual content overlay on the updated feed.

The updated virtual content overlay can include, for example, an indication of an updated direction from the current location of the client device to the location of the autonomous vehicle. Moreover, in some examples, the updated direction from the current location of the client device to the first location of the autonomous vehicle can be determined based on the current location of the client device relative to the location of the autonomous vehicle. In some cases, the current location of the client device can be tracked using sensor data. The sensor data can include, for example and without limitation, inertial measurements (e.g., pitch, roll, yaw measurements; x, y, z coordinate or position measurements, etc.), GPS data, image data (e.g., images and/or videos capturing a local scene associated with the current location of the client device), triangulation data, etc.

In some cases, a location of the autonomous vehicle and/or a location of the client device can be calculated based on sensor data from one or more sensors (104), as described herein. In one illustrative example, the one or more sensors used to obtain the sensor data can include a camera sensor on the client device, a camera sensor on the autonomous vehicle, a LIDAR sensor on the autonomous vehicle, a radar sensor on the autonomous vehicle, a GPS sensor on the client device, and/or a GPS sensor on the autonomous vehicle.

In some implementations, the method 700 can include detecting that the client device has moved and, when the autonomous vehicle is within a field-of-view (FOV) from a current location of the client device, presenting (e.g., at the client device) an updated virtual content overlay on a current feed from the camera sensor. The current feed can capture a scene at the current location of the client device. Moreover, in some examples, the updated virtual content overlay can include an indicator identifying the autonomous vehicle within the current feed. The indicator can include, for example, a virtual pointer or arrow, a graphical icon or callout, a virtual object, a message, a visual identifier, a graphical effect (e.g., a highlight or color effect applied to a rendered representation of the autonomous vehicle and/or a nearby object, a depth-of-field effect bringing into focus an area/item in the feed such as the autonomous vehicle while blurring other areas/items, etc.), etc.

In some cases, the method 700 can also include determining that a camera sensor on the client device used to generate the feed is pointed in a particular direction that does not capture the autonomous vehicle (and/or a particular area near or towards the autonomous vehicle), and presenting one or more indicators identifying a different direction to point the camera sensor to capture the autonomous vehicle. For example, the client device can determine that the camera sensor is pointed in a wrong direction and present an indication (e.g., an arrow or pointer, a message, etc.) identifying a correct or more accurate direction to point the camera sensor in order to capture the autonomous vehicle. In some cases, the client device can generate a visual and/or audio message notifying the user that the camera sensor is pointed in a wrong or inaccurate direction and providing instructions for how or where to point the camera sensor.

In some implementations, the method 700 can also include determining that a view of the autonomous vehicle from a current location of the client device is obstructed by one or more objects (e.g., a building, a fence, a sign, a house, a tree, etc.), and presenting one or more indicators identifying a location of the autonomous vehicle within a current feed from the camera sensor. The one or more indicators can help the user identify the location of the autonomous vehicle despite a view of the autonomous vehicle being obstructed from the current location of the client device (and user). In some examples, the one or more indicators can include a visual representation of the autonomous vehicle superimposed over a rendering of the one or more objects, a description of where the autonomous vehicle is located, a visual indicator identifying where the autonomous vehicle is located, etc.

In some examples, the method 700 can also provide a similar AR wayfinding feature (e.g., an AR wayfinder interface) to help the user reach the user's final destination after being dropped off by the autonomous vehicle. For example, the client device can present a feed from a camera sensor capturing a scene at a location of the user after exiting the autonomous vehicle. The feed can be updated based on new image data (e.g., image and/or video feed data) captured by the camera sensor as the user walks or travels towards the user's final destination. The client device can then present a virtual content overlay within the feed (and updated the virtual content overlay based on a tracked location of the client device), which can include an indication of a direction to travel towards the final destination. The virtual content overlay can provide wayfinding cues within the feed as the user travels to the final destination, to assist the user in locating and/or reaching the final destination.

As described herein, one aspect of the present technology includes gathering and using data available from various sources to improve quality and experience. The present disclosure contemplates that in some instances, this gathered data may include personal information. The present disclosure contemplates that the entities involved with such personal information respect and value privacy policies and practices.

Figure 8:
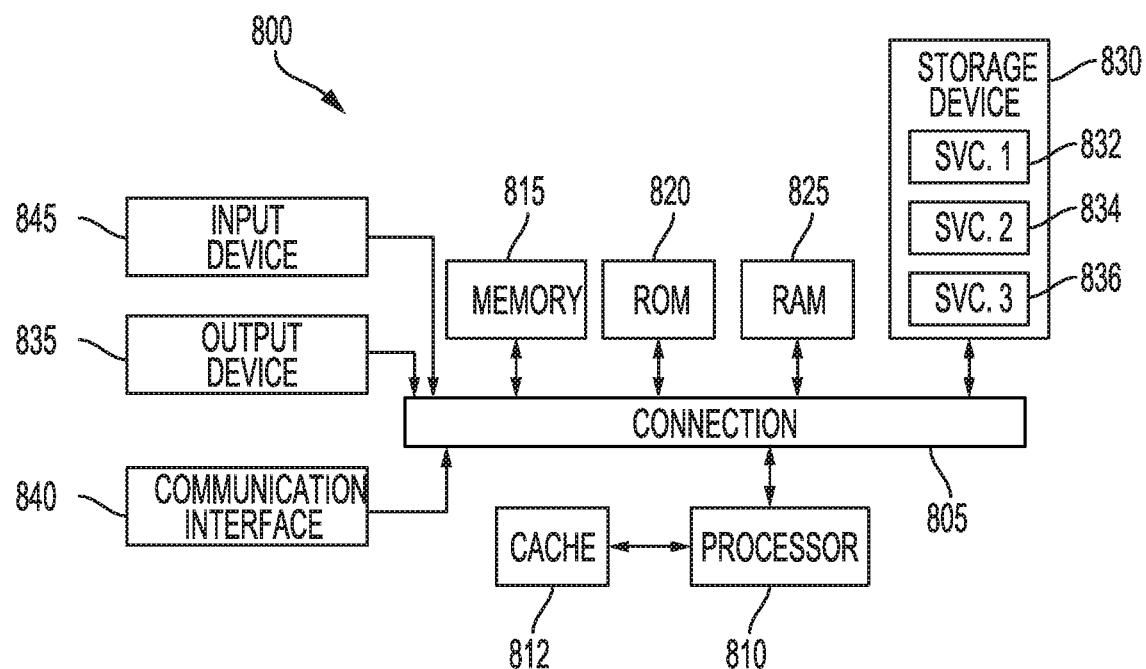
FIG. 8 illustrates an example computing system architecture for implementing various aspects of the present technology.

FIG. 8 illustrates an example computing system 800 which can be, for example, any computing device making up internal computing system 110, remote computing system 150, a client device (e.g., 170) executing rideshare application 172, or any other computing device. In FIG. 8, the components of the computing system 800 are in communication with each other using connection 805. Connection 805 can be a physical connection via a bus, or a direct connection into processor 810, such as in a chipset architecture. Connection 805 can also be a virtual connection, networked connection, or logical connection.

In some implementations, computing system 800 is a distributed system in which the functions described in this disclosure can be distributed within a datacenter, multiple data centers, a peer network, etc. In some implementations, one or more of the described system components represents many such components each performing some or all of the function for which the component is described. In some implementations, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some implementations, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some implementations, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    determining a first location of an autonomous vehicle (AV) relative to a second location of a client device associated with a user that requested a ride from the AV;
    based on the first location of the AV relative to the second location of the client device, determining a direction from the second location of the client device to the first location of the AV;
    presenting, at the client device, an audio cue informing the user that a user action can be performed to activate an augmented reality (AR) wayfinder feature wherein the user action comprises holding the client device vertically;
    in response to performance of the user action of holding the client device vertically, presenting, at the client device, a real-time feed from a camera sensor associated with the client device, the real-time feed comprising a local scene captured by the camera sensor and the real-time feed being from a viewpoint of the camera sensor;
    presenting a virtual content overlay on the real-time feed presented at the client device, the virtual content overlay comprising a first indication of the direction from the second location of the client device to the first location of the AV;
    presenting, at the client device, one or more selectable interface controls for remotely triggering activating a horn on the AV and unlocking the doors on the AV;
    determining that the AV is outside of a field-of-view (FOV) of the camera sensor;
    in response to determining that the AV is outside of the FOV of the camera sensor, presenting, at the client device, a virtual pointer instructing the user to point the camera sensor in a different direction determined to place the AV within the FOV of the camera sensor, wherein a size of the virtual pointer is based on a distance between the AV and the client device, and continuing, after a handoff between the AV and the client device, to provide, on the client device, wayfinding information from a drop-off location associated with the ride to a final destination.

2. The method of claim 1, wherein the virtual content overlay comprises at least one of, a digital message, and a virtual object, and wherein the first indication of the direction from the second location of the client device to the first location of the AV comprises at least one of a path from the second location of the client device to the first location of the AV, a direction for walking from the second location of the client device to the first location of the AV, a description of the first location of the AV, a distance between the second location of the client device and the first location of the AV, and wayfinding instructions.

3. The method of claim 1, further comprising:
presenting, at the client device, one or more selectable interface controls for remotely triggering an action at the AV, the action comprising flashing a light on the AV.

4. The method of claim 1, further comprising:
determining a particular direction in which the camera sensor is pointed; and
presenting, at the client device, an instruction to point the camera sensor in a different direction, the instruction comprising one or more indicators identifying the different direction to point the camera sensor, the different direction being towards at least one of the different location of the AV and an estimated future location of the AV.

5. The method of claim 4, further comprising:
determining that the AV is outside of the FOV of the camera sensor based on the determining the particular direction in which the camera sensor is pointed; and
determining that pointing the camera sensor in the different direction places the AV within the FOV of the camera sensor.

6. The method of claim 1, wherein the first indication comprises a first visual indication, the method further comprising, based on a determination that the AV has moved from the first location to a different location, modifying at least one of a first size and a first shape of a second visual indication relative to at least one of a second size and a second shape of the first visual indication, the at least one of the first size and the first shape of the second visual indication being modified based on a change in a relative distance between the client device and the AV resulting from the AV moving from the first location to the different location, the second visual indication comprising an indication of an updated direction from the second location of the client device to the different location of the AV.

7. The method of claim 1, further comprising:
presenting, via the client device, a digital map identifying the first location of the AV and the second location of the client device, the digital map displaying at least one of a distance between the AV and the client device and a route from a first current location of the AV to a second current location of the client device.

8. The method of claim 1, further comprising:
detecting that the client device has moved from the second location; and
based on a determination that the AV is within a field-of-view of the camera sensor from a current location of the client device, presenting a modified virtual content overlay on a current real-time feed from the camera sensor presented at the client device, the modified virtual content overlay comprising an AV indicator identifying the AV within the current real-time feed presented at the client device.

9. The method of claim 1, further comprising:
detecting that the AV has moved from the first location to a different location;
determining, based on the different location of the AV relative to the second location of the client device, an updated direction from the different location of the AV to the second location of the client device; and
based on a determination that the AV has moved from the first location to the different location, presenting, at the client device, an updated virtual content overlay on an updated real-time feed from the camera sensor, the updated virtual content overlay comprising a second indication of the updated direction from the different location of the AV to the second location of the client device, wherein the updated real-time feed comprises an updated local scene captured by the camera sensor.

10. The method of claim 1, further comprising:
determining that a view of the AV from a current location of the client device is obstructed by one or more objects; and
presenting one or more indicators identifying an AV location within a current feed from the camera sensor, the one or more indicators comprising at least one of a visual representation of the AV superimposed over a rendering of the one or more objects, a description of where the AV is located, and a visual indicator identifying where the AV is located.

11. The method of claim 1, wherein presenting the cue is further in response to the AV arriving near the pick-up location.

12. The method of claim 1, wherein the handoff between the AV and the client device occurs after the AV arrives at the drop-off location associated with the ride.

13. A system comprising:
one or more processors; and
memory comprising instructions stored thereon which, when executed by the one or more processors, cause the one or more processors to:
determine a first location of an autonomous vehicle (AV) relative to a second location of a computing device, wherein the computing device is associated with a user that requested a ride from the AV;
based on the first location of the AV relative to the second location of the computing device, determine a direction from the second location of the computing device to the first location of the AV;
present, at the client device, an audio cue informing the user that a user action can be performed to activate an augmented reality (AR) wayfinder feature wherein the user action comprises holding the client device vertically;
in response to performance of the user action of holding the client device vertically, present a real-time feed from a camera sensor associated with the computing device, the real-time feed comprising a local scene captured by the camera sensor and the real-time being from a viewpoint of the camera sensor;
present a virtual content overlay on the real-time feed, the virtual content overlay comprising a first indication of the direction from the second location of the computing device to the first location of the AV;
present, at the client device, one or more selectable interface controls for remotely triggering activating a horn on the AV and unlocking the doors on the AV;
determine that the AV is outside of a field-of-view (FOV) of the camera sensor;
in response to determining that the AV is outside of the FOV of the camera sensor, present a virtual pointer instructing the user to point the camera sensor in a different direction determined to place the AV within the FOV of the camera sensor wherein a size of the virtual pointer is based on a distance between the AV and the client device; and
continue, after a handoff between the AV and the computing device, to provide, on the computing device, wayfinding information from a drop-off location associated with the ride to a final destination.

14. The system of claim 13, wherein the virtual content overlay comprises at least one of, a digital message, and a virtual object, and wherein the first indication of the direction from the second location of the computing device to the first location of the AV comprises at least one of a path from the second location of the computing device to the first location of the AV, a direction for walking from the second location of the computing device to the first location of the AV, a description of the first location of the AV, a distance between the second location of the computing device and the first location of the AV, and wayfinding instructions.

15. The system of claim 13, wherein the memory comprises additional instructions which, when executed by the one or more processors, cause the one or more processors to:
present one or more selectable interface controls for remotely triggering an action at the AV, the action comprising flashing a light on the AV.

16. The system of claim 13, wherein the memory comprises additional instructions which, when executed by the one or more processors, cause the one or more processors to:
track, based on sensor data, a pose of the computing device;
present an updated real-time feed from the camera sensor, the updated real-time feed comprising an updated local scene captured by the camera sensor at the second location; and
based on the pose of the computing device, present an updated virtual content overlay on the updated real-time feed to include a second indication of an updated direction from the second location of the computing device to the AV.

17. The system of claim 16, wherein the memory comprises additional instructions which, when executed by the one or more processors, cause the one or more processors to:
determine, based on the second location of the computing device relative to the different location of the AV, the updated direction from the second location of the computing device to the different location of the AV, wherein the sensor data comprises at least one of inertial measurements, global positioning system (GPS) data, image data, and triangulation data.

18. The system of claim 13, wherein the first indication comprises a first visual indication, and wherein the memory comprises additional instructions which, when executed by the one or more processors, cause the one or more processors to:
modify, based on a determination that the AV has moved from the first location to a different location, at least one of a first size and a first shape of a second visual indication relative to at least one of a second size and a second shape of the first visual indication, the at least one of the first size and the first shape of the second visual indication being modified based on a change in a relative distance between the computing device and the AV resulting from the AV moving from the first location to the different location, the second visual indication comprising an indication of an updated direction from the second location of the computing device to the different location of the AV.

19. A non-transitory computer-readable storage medium comprising:
instructions stored on the non-transitory computer-readable storage medium, wherein the instructions, when executed by one or more processors, cause the one or more processors to:
determine a first location of an autonomous vehicle (AV) relative to a second location of a client device associated with a user that requested a ride from the AV;
based on the first location of the AV relative to the second location of the client device, determine a direction from the second location of the client device to the first location of the AV;
present, at the client device, an audio cue informing the user that a user action can be performed to activate an augmented reality (AR) wayfinder feature wherein the user action comprises holding the client device vertically;
in response to performance of the user action of holding the client device vertically, present a real-time feed from a camera sensor associated with the client device, the real-time feed comprising a local scene captured by the camera sensor and the real-time being from a viewpoint of the camera sensor;
present a virtual content overlay on the real-time feed, the virtual content overlay comprising a first indication of the direction from the second location of the client device to the first location of the AV;
present, at the client device, one or more selectable interface controls for remotely triggering activating a horn on the AV and unlocking the doors on the AV;
determine that the AV is outside of a field-of-view (FOV) of the camera sensor;
in response to determining that the AV is outside of the FOV of the camera sensor, present a virtual pointer instructing the user to point the camera sensor in a different direction determined to place the AV within the FOV of the camera sensor, wherein a size of the virtual pointer is based on a distance between the AV and the client device; and
continue, after a handoff between the AV and the client device, to provide, on the client device, wayfinding information from a drop-off location associated with the ride to a final destination.

20. The non-transitory computer-readable storage medium of claim 19, storing instructions which, when executed by the one or more processors, cause the one or more processors to:
present one or more selectable interface controls for remotely triggering an action at the AV, the action flashing a light on the AV; and
present a digital map identifying the first location of the AV and the second location of the client device, the digital map displaying at least one of a distance between the AV and the client device and a route from a first current location of the AV to a second current location of the client device.

* * * * *